(12) United States Patent
Marrah et al.

(10) Patent No.: US 7,623,594 B2
(45) Date of Patent: Nov. 24, 2009

(54) SATELLITE RECEIVER SYSTEM

(75) Inventors: Jeffrey J. Marrah, Kokomo, IN (US); Shuping Zhang, Kokomo, IN (US); Douglas A. Cramer, Westfield, IN (US); Harry Diamond, Tipton, IN (US)

(73) Assignee: Delphi Technologies, Inc., Troy, MI (US)

( * ) Notice: Subject to any disclaimer, the term of this patent is extended or adjusted under 35 U.S.C. 154(b) by 640 days.

(21) Appl. No.: 11/364,320

(22) Filed: Feb. 28, 2006

(65) Prior Publication Data
US 2006/0194562 A1 Aug. 31, 2006

Related U.S. Application Data

(60) Provisional application No. 60/657,184, filed on Feb. 28, 2005.

(51) Int. Cl.
*H03D 3/00* (2006.01)
(52) U.S. Cl. .................. 375/323; 370/316; 375/260; 375/295; 375/347; 375/354; 455/334
(58) Field of Classification Search .................. 375/323
See application file for complete search history.

(56) References Cited

U.S. PATENT DOCUMENTS

| 5,912,907 | A * | 6/1999 | Stewart | 714/774 |
| 6,978,117 | B2 * | 12/2005 | Zerod et al. | 455/3.02 |
| 7,440,526 | B2 * | 10/2008 | Dinur et al. | 375/347 |
| 7,447,171 | B2 * | 11/2008 | Smallcomb et al. | 370/316 |
| 7,447,482 | B2 * | 11/2008 | Hirata | 455/101 |
| 2006/0072524 | A1 * | 4/2006 | Perahia et al. | 370/338 |

* cited by examiner

*Primary Examiner*—Shuwang Liu
*Assistant Examiner*—Dhaval Patel
(74) *Attorney, Agent, or Firm*—Jimmy L. Funke

(57) ABSTRACT

An SDARS receiver for use with at least two antennae, each of which receives bitstreams from a first satellite, bitstreams from a second satellite, and bitstreams from a terrestrial repeater, including demodulators configured to switch between demodulating bitstreams from the satellites and to switch between demodulating bitstreams from the terrestrial repeater, and a processor coupled to the demodulators, the processor being configured to switch the demodulators according to a variety of algorithms.

29 Claims, 18 Drawing Sheets

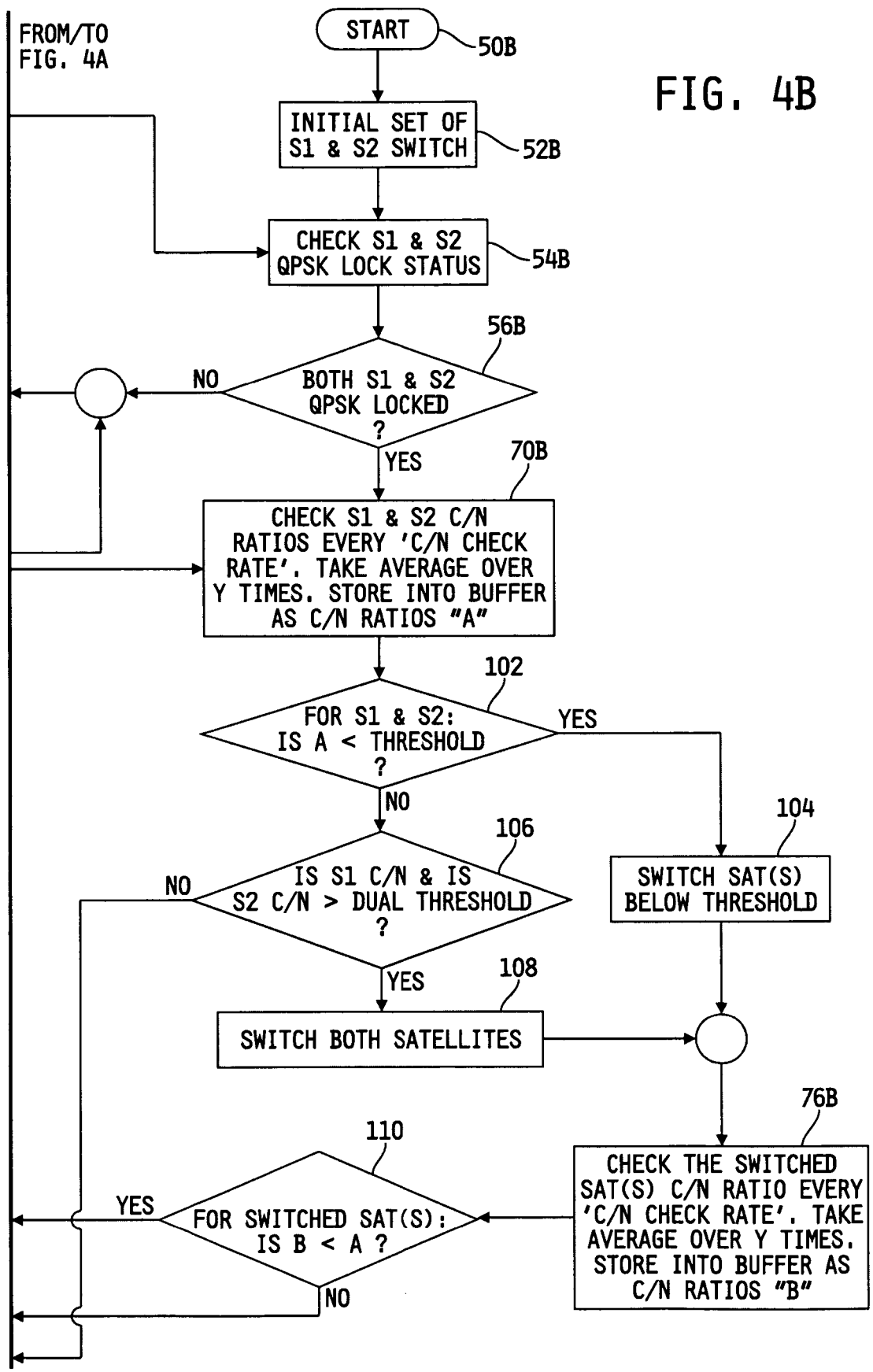

SATELLITE RECEIVER SYSTEM

TECHNICAL BACKGROUND

This application claims the benefit of U.S. Provisional Patent Application Ser. No. 60/657,184, filed Feb. 28, 2005, the disclosure of which is hereby expressly incorporated herein by reference.

FIELD OF THE INVENTION

The present invention generally relates to communication systems, and more particularly to satellite receivers employing switching/combining diversity techniques for use with satellite digital audio radio services (SDARS).

BACKGROUND OF THE INVENTION

SDARS is essentially a radio version of DBS systems such as Direct TV®, and provides audio (music and talk) and data broadcasting. SDARS systems, such as XM Radio® and Sirius®, provide approximately 100 digital quality radio channels of programming to the continental United States. Receivers have been developed for satellite radio reception from, in the case of XM Radio®, two geosynchronous satellites and a plurality of terrestrial repeaters used in areas with limited line-of-sight satellite coverage such as urban canyons and other areas with obstructions. The terrestrial repeaters broadcast the same content as the satellites to improve coverage in the limited line-of-sight areas. The signals transmitted by the satellites (hereinafter, SAT1 and SAT2) are substantially identical, and transmitted using QPSK modulation. To increase coverage reliability, the signals from SAT1 are received terrestrially, reformatted to Multi-Carrier Modulation, and rebroadcast by the non line-of-sight terrestrial repeaters as a terrestrial signal (hereinafter, TERR).

The receivers developed for SDARS systems are used in both fixed and mobile applications. In either case, a minimum signal level (specifically, a minimum "carrier-to-noise" or C/N ratio) must be available to the receiver to maintain the availability of a broadcast channel. In mobile applications, such as receivers used in vehicles, the high variability of the reception environment results in various conditions that can adversely affect the quality of the received signals. For example, multi-path fading, which is created when radio waves arrive at an antenna over routes of different lengths (e.g., some signals arrive directly from the transmission source, and others arrive after being reflected off buildings or other obstructions), causes signal fading because the various signals arriving at different times either reinforce or cancel each other.

Current SDARS receivers use either a Single Arm or a Dual Arm antenna to receive the satellite and terrestrial broadcasts. A Dual Arm antenna includes two, co-located antennae, one for receiving the satellite broadcasts and another for receiving the terrestrial broadcasts. Such antennae are normally located on a vehicle such that they have substantially direct line-of-sight access from horizon to zenith in all directions to maximize gain and accommodate for the low link margin generally associated with satellite transmissions. Unfortunately, few locations on vehicles meet this placement criteria, and vehicle manufacturers have limited styling flexibility if they wish to accommodate SDARS systems.

SUMMARY OF THE INVENTION

The present invention permits increased styling flexibility by providing a system that uses two or more antenna placed in different locations and switching diversity techniques to present the SDARS receiver with an antenna equivalent to an ideally placed, unobstructed antenna, thereby reducing the impacts of fading and the possibility of reception mutes. In general, two or more antennae are placed in electrically "diverse" positions which need not satisfy the above-mentioned line-of-sight placement criteria. These antennae may be buried in window glass, side mirrors, or otherwise "invisibly" located to eliminate aesthetic distractions, thereby improving the manufacturer's styling flexibility. The SDARS receiver is configured to intelligently select the stronger of the two or more signals received by the two or more antennae according to one or more of a variety of diversity algorithms.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIGS. 13A through 16B are flow charts representing satellite signal selection algorithms according to the present invention.

Figure 1:
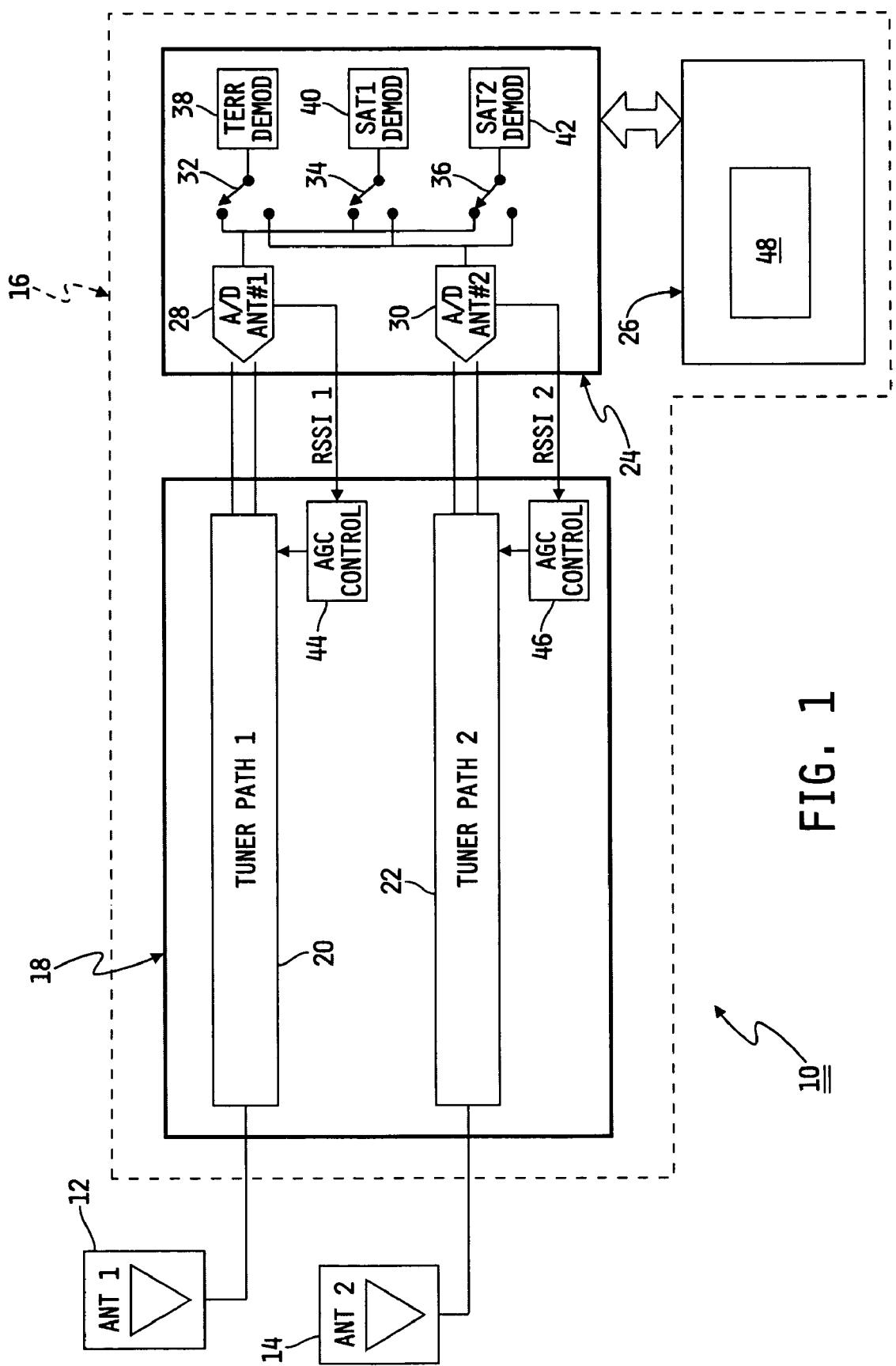
FIG. 1 is a schematic diagram of a single baseband embodiment of a system according to the present invention.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF INVENTION

The embodiments disclosed below are not intended to be exhaustive or to limit the invention to the precise forms disclosed in the following detailed description. Rather, the embodiments are chosen and described so that others skilled in the art may utilize their teachings.

Referring now to FIG. 1, one embodiment of a system 10 according to the present invention includes a first antenna 12, a second antenna 14, and a receiver 16. While the following description refers to only two antennae, it should be understood that the principles described herein may readily be applied to systems having more than two antennae. Receiver 16 includes, among other things, an RF tuner 18 having a first tuner path 20 coupled to antenna 12 and a second tuner path 22 coupled to antenna 14, a baseband 24, and a microprocessor 26. As shown, baseband 24 includes a first A/D converter 28 coupled to tuner path 20, a second A/D converter 30 coupled to tuner path 22, a first switch 32, a second switch 34, a third switch 36, a TERR demodulator 38, a SAT1 demodulator 40, and a SAT2 demodulator 42. The output of A/D converter 28 is routed to one input of each of switches 32, 34, and 36, and the output of A/D converter 30 is routed to the other input of each of switches 32, 34, and 36. As will be further discussed below, A/D converter 28 also provides a received signal strength indicator (RSSI) feedback signal to an AGC control block 44 coupled to tuner path 20. Similarly, A/D converter 30 provides an RSSI feedback signal to an AGC control block 46 coupled to tuner path 22.

Microprocessor 26 represents, among other things, electronics for controlling the operation of receiver 16, and includes an associated memory storage device 48. Memory 48 includes software that embodies, among other things, control algorithms for implementing switching diversity techniques according to the present invention.

As should be apparent from the foregoing, in SDARS systems, each signal from each antenna 12, 14 includes three bitstreams: one representing SAT1, one representing SAT2, and one representing TERR. In operation, the three bitstreams are provided to the respective tuner paths 20, 22 and processed according to techniques that are well known in the art. The outputs of each tuner path 20, 22 are converted to digital signals by the respective A/D converters 28, 30, and, according to one of the switching diversity algorithms described below, TERR demodulator 38 demodulates the TERR bitstream from one of A/D converters 28, 30, SAT1 demodulator 40 demodulates the SAT1 bitstream from one of A/D converters 28, 30, and SAT2 demodulator 42 demodulates the SAT2 bitstream from one of A/D converters 28, 30.

As should also be apparent from the foregoing, the single baseband architecture of FIG. 1 utilizes a single digital back end with sufficient demodulators to demodulate each of the three bitstreams TERR, SAT1, and SAT2. While each tuner path 20, 22 always actively processes signals received by the respective antenna 12, 14, the tuner paths 20, 22 feed a single baseband 24, which can only demodulate a TERR bitstream from one of tuner paths 20, 22, a SAT1 bitstream from one of tuner paths 20, 22, and a SAT2 bitstream from one of tuner paths 20, 22. Unlike the dual baseband architecture described with reference to FIGS. 10 through 12, system 10 cannot compare most characteristics of the signals received by each of antenna 12, 14 and select the most desirable signal. Instead, system 10 employs the switching diversity algorithms described below to determine, based on the characteristics of the currently demodulated bitstreams (TERR, SAT1, and SAT2) received by one antenna 12, 14, whether to demodulate the corresponding bitstreams received by the other antenna 12, 14. Except as described herein, the algorithms used for selection of the satellite bitstreams SAT1 and SAT2 are employed substantially independent of the algorithms employed for selection of the TERR bitstream.

Figure 2:
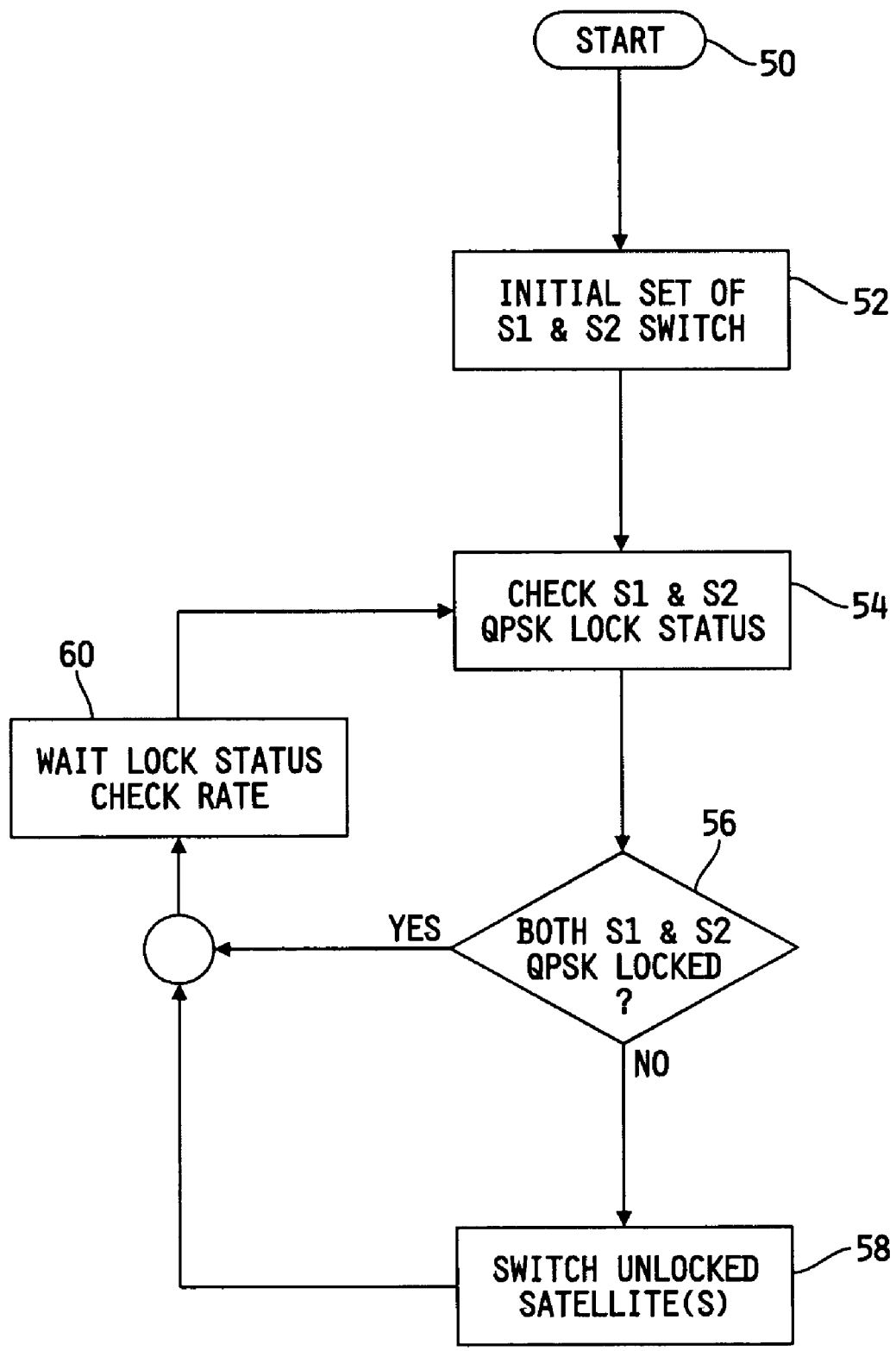
FIGS. 2 through 4B are flow charts representing satellite signal selection algorithms according to the present invention.

A first embodiment of an algorithm for controlling satellite signal selection is depicted in flowchart form in FIG. 2. In general, each satellite demodulator 40, 42 includes a QPSK Lock Status indicator (a high level demodulator status flag indicating adequate synchronization) that can be used as a trigger to determine which antenna 12 or antenna 14 currently provides a superior signal. More specifically, the QPSK Lock Status indicator is a rapidly updated hardware output pin of baseband 24 that is provided to microprocessor 26 and indicates whether receiver 16 is locked onto the satellite signal. If a signal received by one of the antennae 12, 14 is not locked, then a reduced amount of usable information is received by that antenna 12, 14.

After the algorithm of FIG. 2 is initiated at block 50, microprocessor 26 commands SAT1 demodulator 40 to cause switch 34 to connect SAT1 demodulator 40 to one of the two switch inputs (i.e., one provided by A/D converter 28 or one provided by A/D converter 30). Similarly, microprocessor 26 commands SAT2 demodulator 42 to cause switch 36 to connect SAT2 demodulator 42 to one of the two switch inputs. These initial switch settings are represented by block 52. At block 54, microprocessor 26 reads from baseband 24 the QPSK Lock Status indicators associated with the currently demodulated SAT1 and SAT2 bitstreams. At block 56, microprocessor 26 determines whether both the SAT1 and SAT2 bistreams are QPSK locked, as indicated by the corresponding QPSK Lock Status indicators. If both bitstreams are currently QPSK locked, then the algorithm does not result in a changed position of either of switches 34, 36. In other words, as the signals being demodulated by SAT1 demodulator 40 and SAT2 demodulator 42 are QPSK locked under the current configurations of switches 34, 36, this algorithm will not result in a change. If, on the other hand, one of the SAT1 or SAT2 bitstreams are not QPSK locked, then the algorithm will cause (at block 58) a change in the position of the switch 34, 36 corresponding to the bitstream that is not QPSK locked. For example, if the QPSK Lock Status indicator for the SAT1 bitstream indicates that the currently demodulated SAT1 bitstream is not QPSK locked and SAT1 demodulator 40 is currently coupled to A/D converter 28 through switch 34, then microprocessor 26 will command SAT1 demodulator 40 to cause switch 34 to change position such that SAT1 demodulator is coupled to A/D converter 30. Throughout the remainder of this description, the type of re-configuration of input signal to a demodulator will be referred to as "switching satellites" because it results in demodulation of a particular bitstream (i.e., SAT1 or SAT2) received from an antenna 12, 14 that is different from the currently used antenna 12, 14. Of course, as the SAT1 and SAT2 bitstreams are handled independently by the algorithm, if both bitstreams are QPSK unlocked, then microprocessor 26 will command both SAT1 demodulator 40 and SAT2 demodulator 42 to switch satellites.

After an above-described satellite switch is performed, or if both SAT1 and SAT2 bitstreams are QPSK locked, the algorithm waits a pre-determined period of time, such as 4 ms (or within the range of 0.1 ms to 128 ms) (as represented by block 60), before performing another QPSK Lock Status indicator check at block 54. The algorithm then continues to loop through blocks 54, 56, 58 and 60 in an attempt to minimize demodulation of SAT1 and SAT2 bitstreams that are not QPSK locked.

Figure 3A:
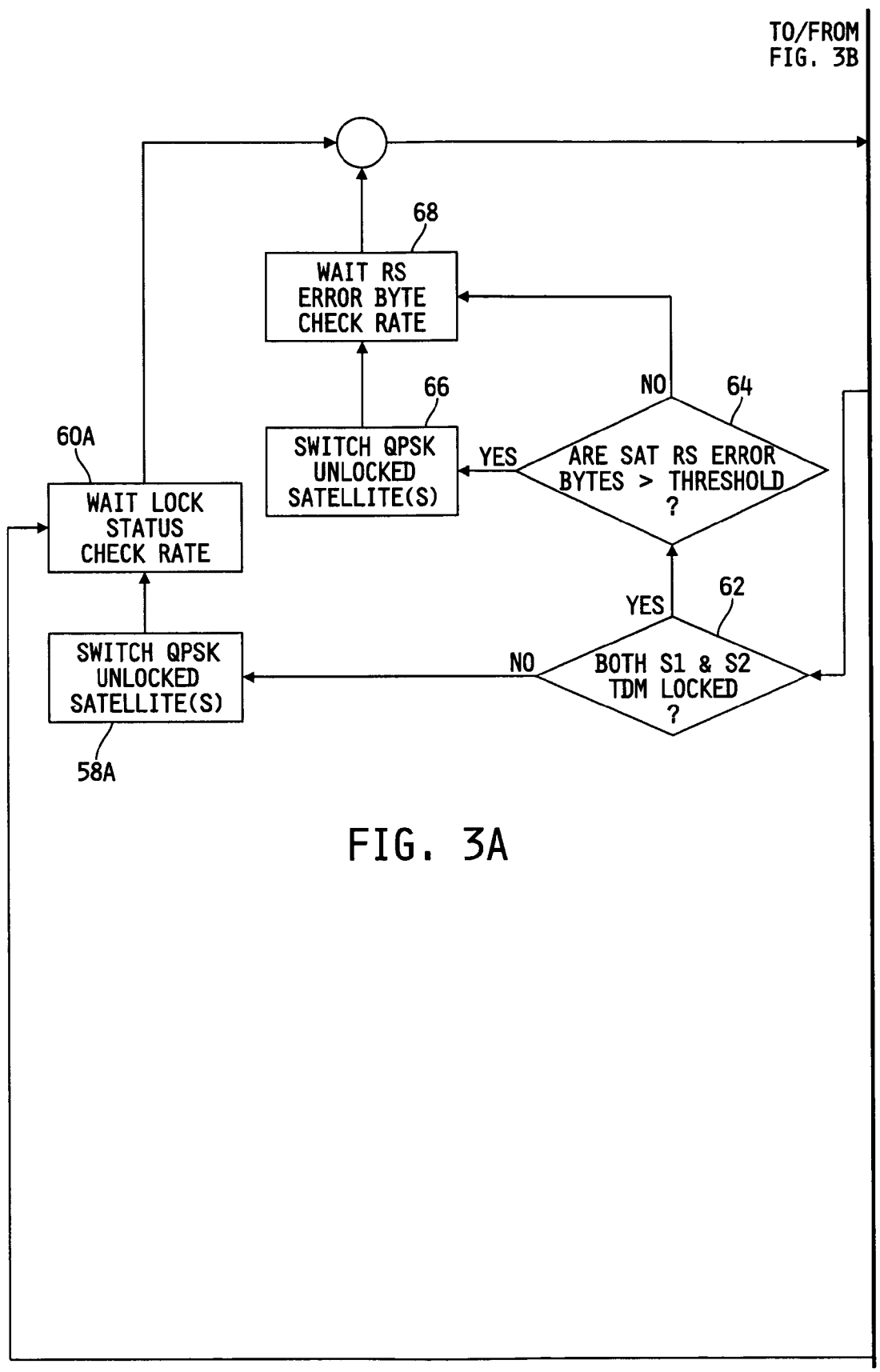
Figure 3B:
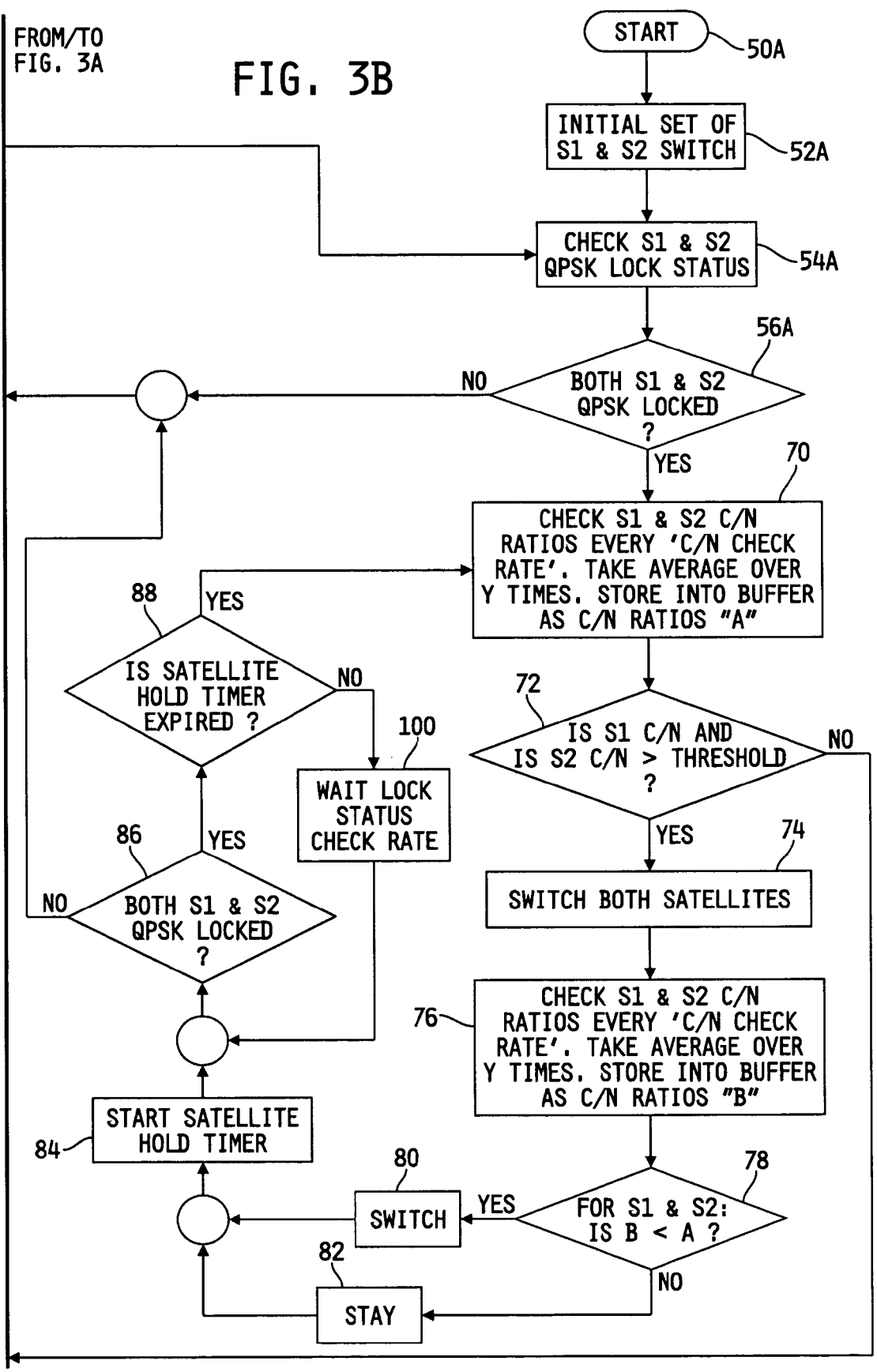

Referring now to FIGS. 3A and 3B, another embodiment of an algorithm for controlling satellite signal selection is depicted in flowchart form. In its most basic form, the algorithm of FIGS. 3A and 3B does not include the operations represented by blocks 62, 64, 66, and 68 (FIG. 3A). After the basic form is described below, the function and implementation of these blocks will be described. It should be recognized that if blocks 62, 64, 66, and 68 are removed from FIG. 3A, then the upper portion of the combination of FIG. 3A and FIG. 3B is substantially identical to FIG. 2. More specifically, blocks 50A, 52A, 54A, 56A, 58A, and 60A are identical to blocks 50, 52, 54, 56, 58, and 60 of FIG. 2. Accordingly, the operations performed by these blocks will not be described in detail with reference to FIGS. 3A and 3B.

As shown, if the QPSK Lock Status indicators read in block 54A and checked in block 56A indicate that one or both the SAT1 and SAT2 bitstreams are not QPSK locked, then microprocessor 26 causes the appropriate one or both of SAT1 demodulator 40 and SAT2 demodulator 42 to switch satellites at block 58A as described above. Then, the lock status check rate delay is imposed at block 60A, and the loop is repeated. If, on the other hand, both of the SAT1 and SAT2 bitstreams are QPSK locked as determined at block 56A, the operation of the algorithm of FIGS. 3A and 3B is different from the operation of the algorithm of FIG. 2. Instead of simply waiting to perform another QPSK Lock Status check, the algorithm of FIGS. 3A and 3B causes (at block 70) microprocessor 26 to read from baseband 24 the Carrier-to-Noise (C/N) ratios corresponding to each of the SAT1 and SAT2 bitstreams. The C/N ratios may be read several times, once per C/N check rate (in one embodiment, approximately 128 milliseconds), and averaged to provide more accurate C/N ratio readings. Alternatively, the C/N ratios may be read once (i.e., the variable Y referred to in block 70 equals one). In either case, the resulting C/N ratio measurements (one for the SAT1 bitstream and one for the SAT2 bitstream) are stored in a buffer or temporary location in memory 48 as C/N ratios "A." More specifically, the C/N ratio for the SAT1 bitstream is stored as C/N ratio $A_{SAT1}$, and the C/N ratio for the SAT2 bitstream is stored as C/N ratio $A_{SAT2}$.

At decision block 72, microprocessor 26 compares the C/N ratios derived at block 70 to a predetermined threshold value which indicates satisfactorily high C/N ratios corresponding to relatively strong signal reception. For example, a threshold of 6.5 dB (or a threshold within the range of 3 dB to 10 dB) may be used. If the C/N ratios are both above 6.5 dB, then system 10 is in a time buffer mode wherein the received signals are used to create a few seconds of buffered data that can be used to continue substantially error-free decoding of the bitstreams through deep signal fades that would normally cause errors. If, on the other hand, one or both of the C/N ratios are below 6.5 dB, then system 10 will likely need to use both the SAT1 and SAT2 bitstreams to construct a substantially error-free audio or data signal, and the satellite switching potentially involved in the subsequent operations of the algorithm should be omitted until the reception environment improves. Accordingly, if the outcome of decision block 72 is "No" (i.e., one or both of C/N ratio $A_{SAT1}$ and C/N ratio $A_{SAT2}$ are below the predetermined threshold), then the algorithm enters the delay period of block 60A.

If both C/N ratios are above the threshold, then microprocessor 26 causes both SAT1 demodulator 40 and SAT2 demodulator 42 to switch satellites as indicated by block 74. At block 76, microprocessor 26 repeats the C/N ratio reading operation described with reference to block 70, except that the C/N ratios resulting from the operation of block 76 are stored as C/N ratio $B_{SAT1}$ and C/N ratio $B_{SAT2}$. Thus, at this point the C/N ratios for the SAT1 bitstream as received by antenna 12 and as received by antenna 14 are stored, and the C/N ratios for the SAT2 bitstream as received by both antennae are stored. At decision block 78, microprocessor 26 compares C/N ratio $A_{SAT1}$ to C/N ratio $B_{SAT1}$ and C/N ratio $A_{SAT2}$ to C/N ratio $B_{SAT2}$. If either of the C/N ratio B values are less than the corresponding C/N ratio A value (i.e., the currently received signal for that satellite is of lower quality than the signals received before the satellite switching of block 74), then microprocessor 26 (at block 80) causes the appropriate SAT1 demodulator 40 or SAT2 demodulator 42 to switch the satellite back to the previous configuration. If the C/N ratio B value for one or both of the SAT1 and SAT2 bitstreams is greater than the corresponding C/N ratio A value, then the switch configuration corresponding to that (or both) satellite is not changed as represented by block 82. In this manner, the SAT1 bitstream having the highest C/N ratio is selected and the SAT2 bitstream having the highest C/N ratio is selected (referred to as "a peak detect operation").

Regardless of whether satellite switching occurred as a result of decision block 78, a hold timer is initiated at block 84 to delay the next peak detect operation. As the peak detect operation involves satellite switching, it may cause errors. Accordingly, while the peak detect operation may reduce errors by resulting in selection of the satellite configuration that is currently the most desirable, the process for making that determination may, itself, cause errors. As such, a compromise is to perform the peak detect operation less frequently. In one embodiment of the invention, the satellite hold timer is approximately 4 seconds (or within the range of 100 ms to 5 seconds).

During the satellite hold time, the QPSK Lock Status indicators for each of the SAT1 and SAT2 bitstreams are read in the manner described with reference to blocks 54 and 56 of FIG. 2. If one of the SAT1 or SAT2 bitstreams are not QPSK locked as determined at decision block 86, then control of the algorithm is transferred to block 58A, where microprocessor 26 causes the demodulator 40 or 42 corresponding to the QPSK unlocked bitstream to switch satellites. If both bitstreams are still QPSK locked, then microprocessor 26 determines whether the satellite hold timer has expired at block 88. If the satellite hold timer has not yet expired, then microprocessor 26 waits (at block 100) a predetermined period of time corresponding to the QPSK Lock Status check rate described above with reference to block 60 of FIG. 2. This loop continues until one of the SAT1 or SAT2 bitstreams becomes QPSK unlocked, or the satellite hold timer expires. When the satellite hold timer expires as determined at block 88, another peak detect operation begins at block 70. In this manner, the algorithm repeatedly attempts to select a SAT1 and a SAT2 bitstream (independent of one another) as received by one of the two antennae 12, 14 that has the best C/N ratio, so long as both the SAT1 and SAT2 bitstreams remain QPSK locked.

In an alternate embodiment, but still referring to FIGS. 3A and 3B, the operations of blocks 62 and 68 are performed in addition to those operations described above. In this embodiment, only blocks 64 and 66 are omitted. More specifically, if the QPSK Lock Status indicator read and checked at decision block 56A does not indicate that both the SAT1 and SAT2 bitstreams are QPSK locked, then instead of switching the satellite of the QPSK unlocked bitstream, microprocessor 26 reads a time division multiplex (TDM) Lock Status indicator from baseband 24 for each of the SAT1 and SAT2 bitstreams at block 62. The QPSK Lock Status indicator provides information regarding the relatively coarse frequency and phase alignment of the SAT1 and SAT2 bitstreams. Each bitstream may, however, remain TDM locked due to the spatial diversity gain between the dual satellites. Because of this, substantially error-free data can be achieved even if the bitstreams are not QPSK locked. Moreover, as a result of certain characteristics of the bitstreams, a bitstream will always become QPSK unlocked before it becomes TDM unlocked. At decision block 62, microprocessor 26 determines whether both the SAT1 and the SAT2 bitstreams are TDM locked. If both are TDM locked, even though one or both were determined to be QPSK unlocked at decision block 56A, then microprocessor 26 waits a predetermined period of time (e.g., 16 ms or within the range of 8 ms to 2 seconds) corresponding to the Reed-Solomon (R/S) Error Byte Check Rate of baseband 24. Thus, the algorithm avoids an unnecessary satellite switch that could have resulted in bitstream errors. If one or both of the bitstreams are not TDM locked, then microprocessor 26 causes a satellite switch of the QPSK unlocked bitstream(s) at block 58A, and processing continues as described above.

In another variation of the algorithm depicted in FIGS. 3A and 3B, the operations corresponding to all of blocks 62, 64, 66, and 68 are performed. Thus, if the result of decision block 62 is that both of the SAT1 and SAT2 bitstreams are TDM locked, then (at decision block 64) microprocessor 26 reads the R/S error bytes corresponding to the combined bitstream of the SAT1 and SAT2 bitstreams from baseband 24. As is known in the art, a specified number of R/S errors may be present in a bitstream without loss of information. Thus, by comparing the R/S error bytes present in the combined satellite bitstream to a predetermined threshold value such as 10 bytes (or within the range of 1 to 31 bytes), microprocessor 26 is able to determine whether the combined satellite bitstream include a recoverable amount of errors (i.e., less than the threshold) or a nearly unrecoverable amount of errors (i.e., greater than the threshold). If the combined bitstream has R/S error byte counts that exceed the threshold, then microprocessor 26 causes a satellite switch at block 66 for whichever one or both of the bitstreams was identified as being QPSK unlocked at decision block 56A. If the combined bitstream has R/S error byte counts that are less than the threshold, then satellite switching does not occur, and the algorithm waits the R/S Error Byte Check Rate at block 68.

Figure 4A:
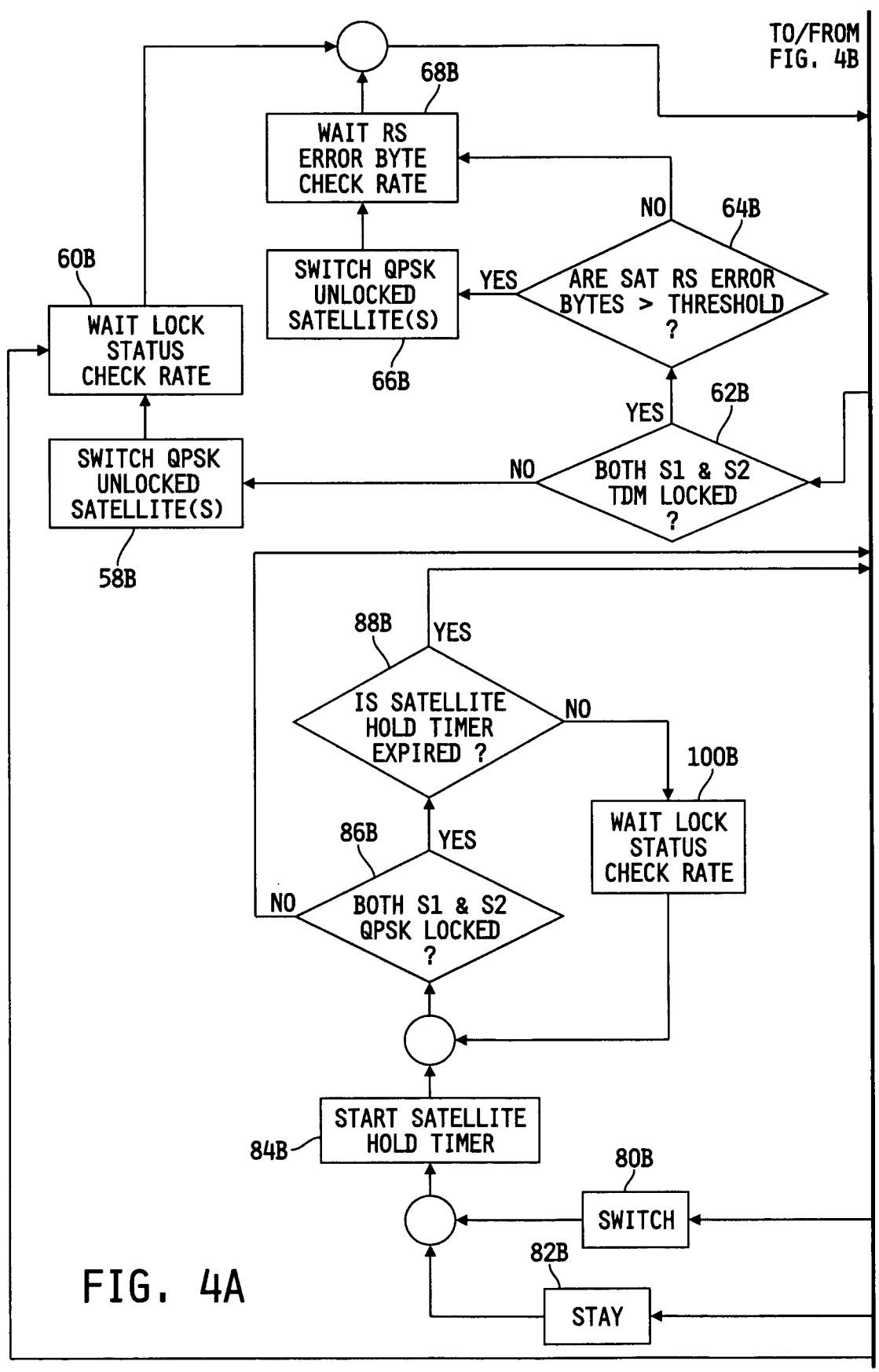

Referring now to FIGS. 4A and 4B, another embodiment of an algorithm for controlling satellite signal selection is depicted in flowchart form. In its most basic form, the algorithm of FIGS. 4A and 4B does not include the operations represented by blocks 62B, 64B, 66B, and 68B. As the operation of these functional blocks as well as the incorporation of one or both of the TDM lock check and R/S error byte check into the algorithm of FIGS. 4A and 4B is identical to that described with reference to FIGS. 3A and 3B, the description for this algorithm is omitted. Additionally, the operation of blocks 50B, 52B, 54B, 56B, 58B, and 60B is identical to that described above with reference to FIGS. 3A and 3B. Accordingly, the operation of these blocks is not described in detail below.

If, at block 56B, both bitstreams are determined to be QPSK locked, then microprocessor 26 reads and stores C/N ratios for both bitstreams at block 70B in a manner that is identical to that described above with reference to block 70 of FIG. 3B. Otherwise, microprocessor 26 switches the QPSK unlocked satellite(s), performs the above-described optional TDM lock check, or performs both the above-described optional TDM lock check and the optional R/S error byte check. After storing the C/N ratios at block 70B, microprocessor 26 compares both ratios individually to a predetermined threshold value at decision block 102. Unlike the threshold used in block 72 of FIG. 3B, the threshold used in block 102 (e.g., 5.5 dB or within the range of 4 dB to 10 dB) is used to determine whether the C/N ratio for each bitstream is currently acceptable. If the C/N ratio of a bitstream is currently acceptable, then microprocessor 26 will not switch the satellite corresponding to that bitstream, thereby avoiding the possibility of switching to a less desirable signal. If, on the other hand, one or both of the C/N ratios are below the threshold of block 102, then microprocessor 26 switches the satellite(s) corresponding to the currently unacceptable C/N ratio at block 104.

At block 72B, microprocessor 26 compares the C/N ratios derived at block 70B to a predetermined threshold value which indicates satisfactorily high C/N ratios corresponding to relatively strong signal reception in the manner described above with reference to block 72 of FIG. 3B. If the C/N ratios corresponding to both bitstreams are greater than the dual threshold, then microprocessor 26 switches both satellites at block 108 and again obtains a C/N ratio measurement for each bitstream at block 76B in the manner described above with reference to block 76 of FIG. 3B. If one or both of the C/N ratios are less than the dual threshold of block 72B, then microprocessor 26 waits a period of time corresponding to the lock status check rate at block 60B as explained above.

At block 78B, microprocessor 26 compares the stored "A" and "B" C/N ratios corresponding to the bitstream(s) of the switched satellite(s) in the manner described above with reference to block 78 of FIG. 3B. It should be understood that the ratios will be compared for the bitstreams of both SAT1 and SAT2 if both satellites were switched at block 108, but the ratios may be compared for only one bitstream if only one satellite was switched at block 104. If, for the compared ratio(s), the "B" C/N ratio is less than the "A" C/N ratio, then the corresponding satellite(s) is/are again switched at block 80B. Otherwise, no satellite switching occurs as indicated by block 82B. The remainder of the operation depicted by the flow diagram of FIGS. 4A and 4B is identical to that described above with reference to FIGS. 3A and 3B.

Figure 5:
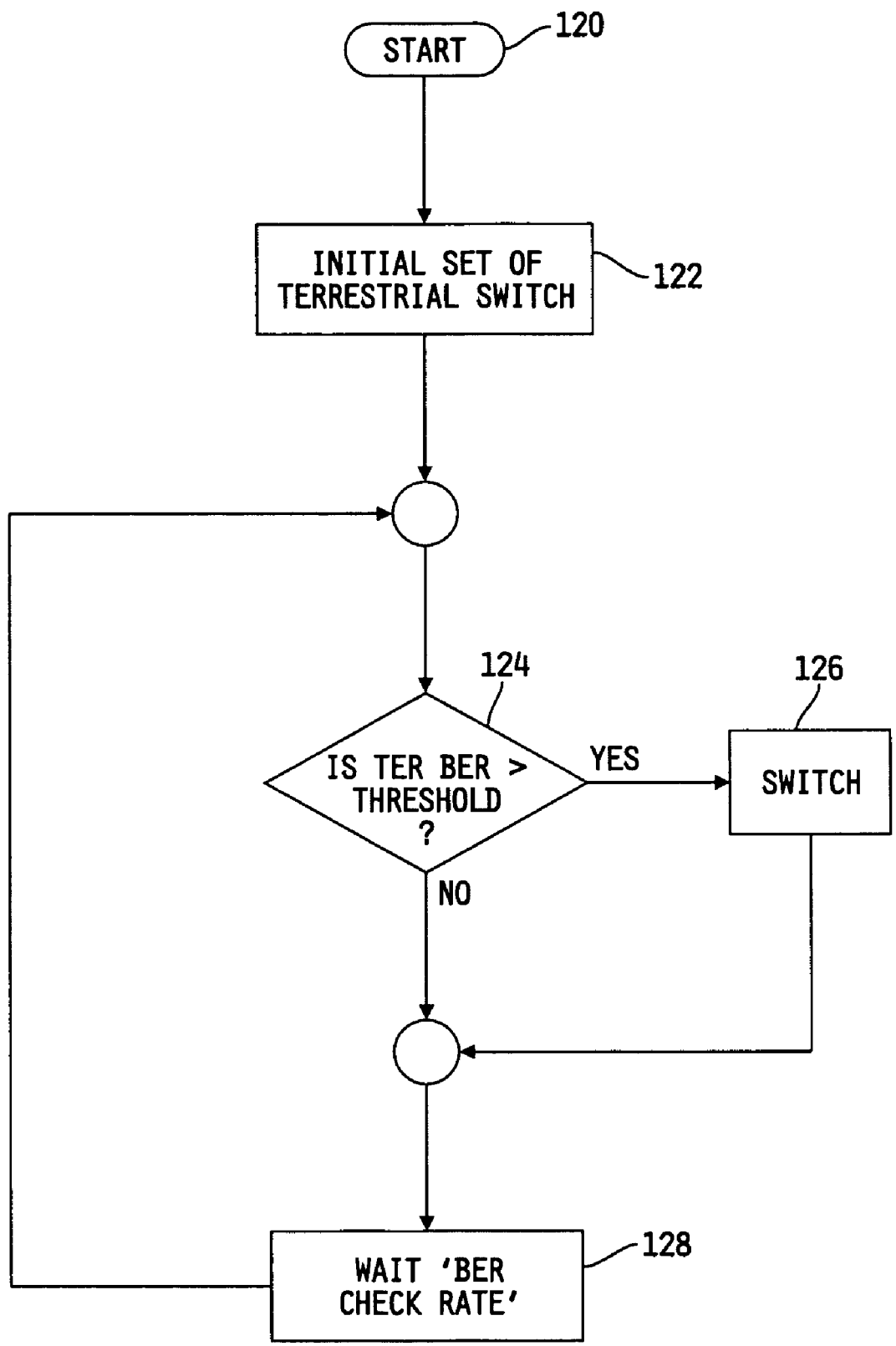
FIG. 5 through 9 are flow charts representing terrestrial signal selection algorithms according to the present invention.

FIGS. 5 through 9 depict algorithms for controlling terrestrial signal selection. It should be understood that, except as expressly noted, the terrestrial signal selection algorithms described below are performed simultaneously with, but substantially independent of the satellite signal selection algorithms described above. Referring to FIG. 5, the algorithm begins at block 120, after which microprocessor 26 commands TERR demodulator 38 of FIG. 1 to cause switch 32 to move to an initial position, thereby permitting TERR demodulator 38 to demodulate one of the two TERR bitstreams from one of A/D converters 28, 30. For the selected TERR bitstream, microprocessor 26 then reads from baseband 24 the current bit error rate (BER) at block 124 and compares it to a predetermined threshold value such as 5% (or within the range of 4% to 8%). If the BER exceeds the threshold, then microprocessor 26 commands TERR demodulator 38 to cause switch 32 to move to a different position at block 126, thereby connecting TERR demodulator 38 to a different A/D converter 28, 30 (hereinafter referred to as "a TERR switch"). After the TERR switch is performed, or if the current BER is less than the threshold of block 124, microprocessor 26 waits a predetermined period of time corresponding to the BER check rate (e.g., 1.5 seconds or within the range of 432 ms to 4 seconds) at block 128. After the delay of block 128, microprocessor 26 again compares the current BER to the threshold at block 124. This loop continues, using the terrestrial BER as a trigger for a TERR switch in an attempt to select for demodulation the TERR bitstream currently having a BER less than the threshold.

Figure 6:
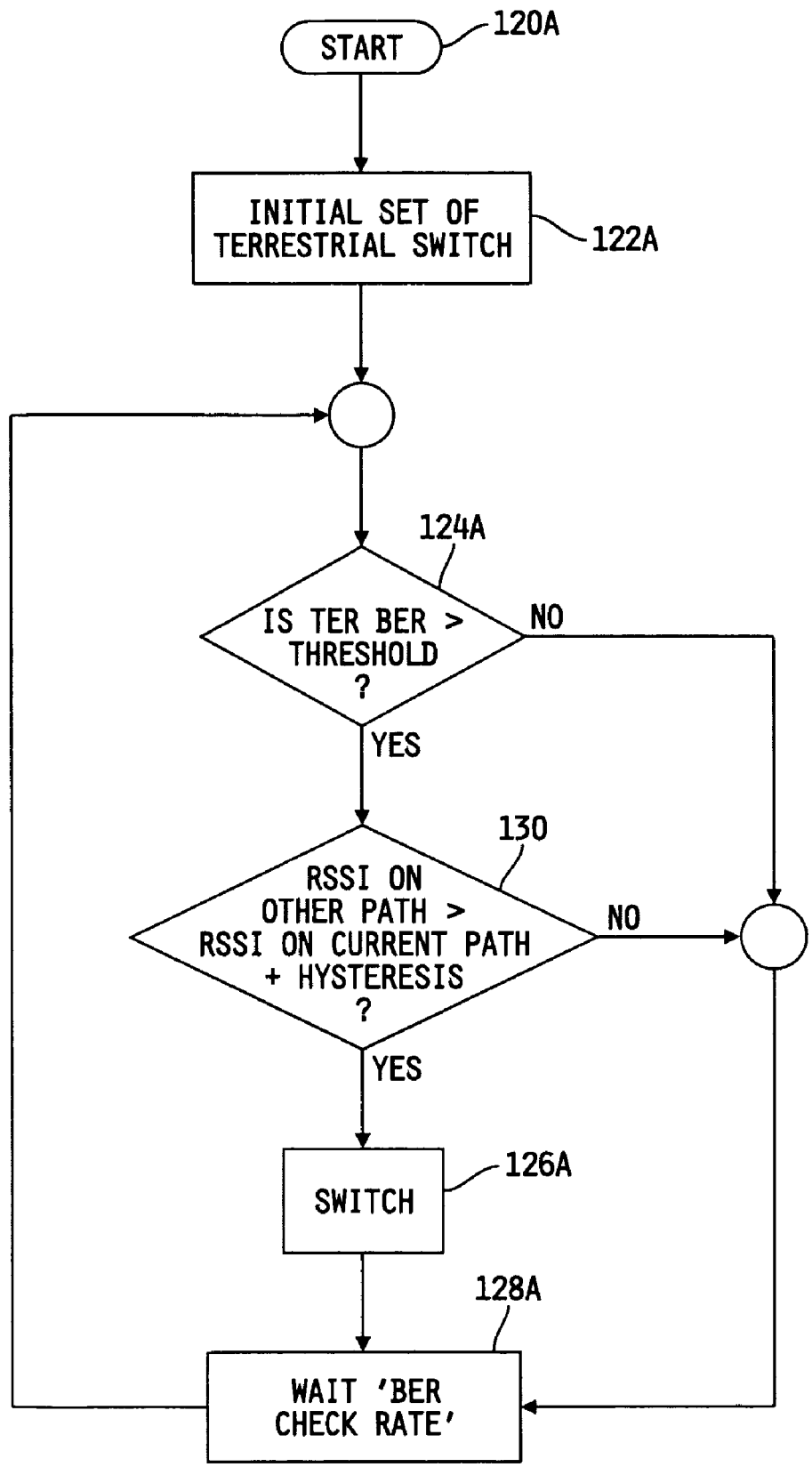

The algorithm of FIG. 6 adds a second level test before causing a TERR switch to reduce TERR switches to a less desirable TERR bitstream. The operation depicted by blocks 120A, 122A, 124A, 126A, and 128A are substantially identical to the corresponding blocks of FIG. 5. If the current BER is greater than the threshold of block 124A, instead of causing a TERR switch, microprocessor 26 reads at block 120 the received signal strength indicator (RSSI) corresponding to each of tuner paths 20, 22 from baseband 24. As is well understood in the art, the RSSI is similar to a power measurement for the received signal. Microprocessor 26 also compares the RSSI corresponding to the currently unselected TERR bitstream to the RSSI of the currently selected TERR bitstream (plus a hysteresis factor to account for variations over time). If the comparison at decision block 130 indicates that the RSSI of the unselected bitstream is not greater than the RSSI of the selected bitstream, then microprocessor 26 does not cause a TERR switch, even though the current BER exceeds the threshold of block 124A. If, on the other hand, the RSSI of the unselected bitstream is greater than the RSSI of the selected bitstream, then microprocessor 26 causes a TERR switch at block 126A.

Figure 7:
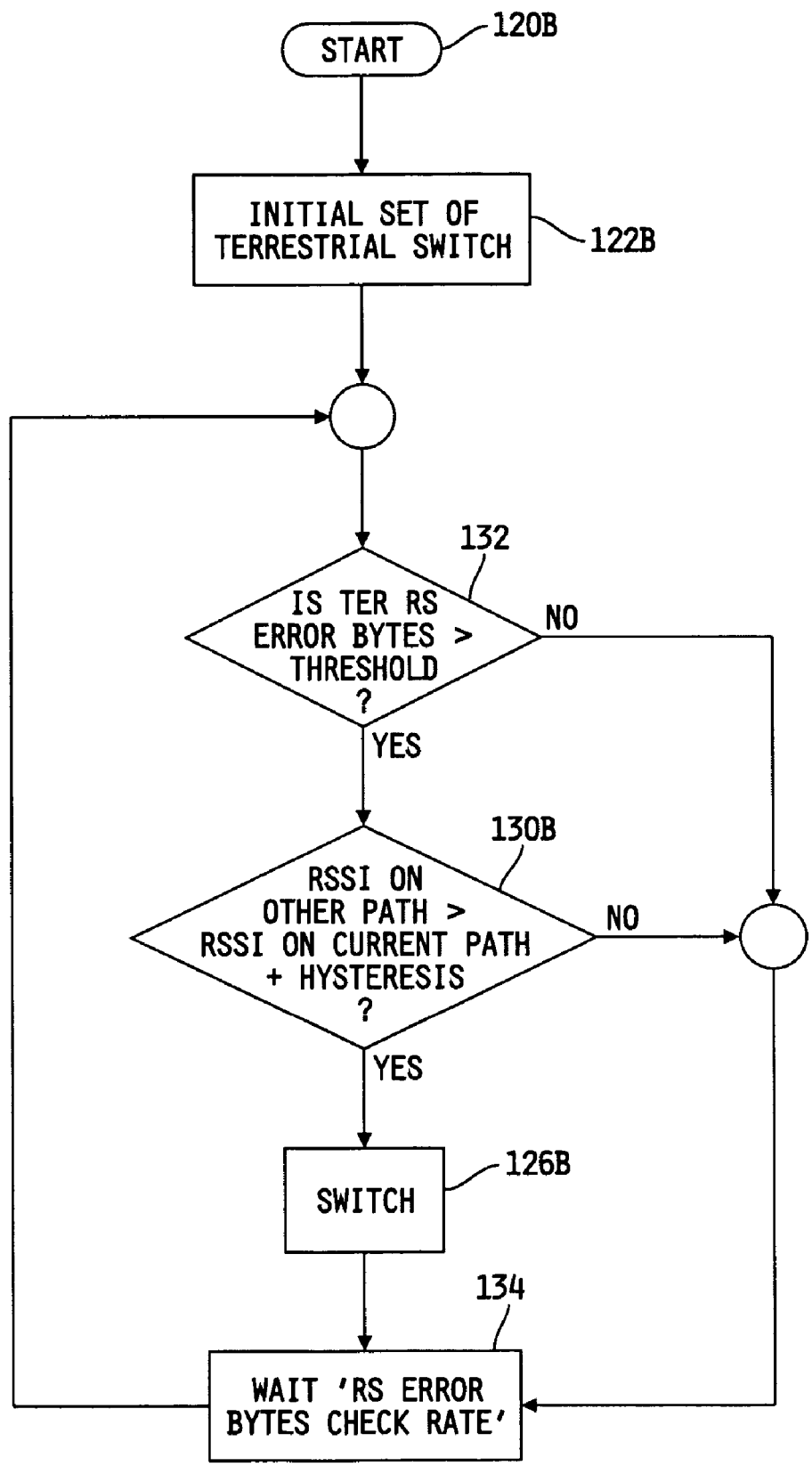

Referring now to FIG. 7, the operation of blocks 120B, 122B, 126B, and 130B are substantially identical to blocks having the same base reference numbers described with reference to previous figures. In the algorithm of FIG. 7, the BER test of blocks 124 (FIG. 5) and 124A (FIG. 6) is replaced by a test of the TERR R/S error byte count at block 132. As the R/S error byte count is updated faster than the BER, which requires a larger number of bits, the R/S error byte test of block 132 permits more frequent testing of the errors contained in the currently selected TERR bitstream. Also, the TERR R/S error bytes take into account SAT1 bits, when available, to extend the sensitivity of the TERR bitstream. If the R/S error byte count does not exceed a predetermined threshold (e.g., 16 bytes), then microprocessor 26 waits a predetermined amount of time corresponding to the R/S error byte check rate (e.g., 1.5 seconds or within the range of 432 ms to 4 seconds) before performing another test. If the R/S error byte count exceeds the threshold at block 132, then (at block 130B) microprocessor performs the RSSI comparison described above with reference to block 130 of FIG. 6. It should be understood, however, that block 130 is optional, and that, in its simplest form, the algorithm of FIG. 7 would not include block 130. If the RSSI comparison indicates that the power of the currently unselected TERR bitstream is better than that of the selected bitstream, then microprocessor 26 causes a TERR switch at block 126B. Otherwise, the loop is repeated without a TERR switch after the delay of block 134.

Figure 8:
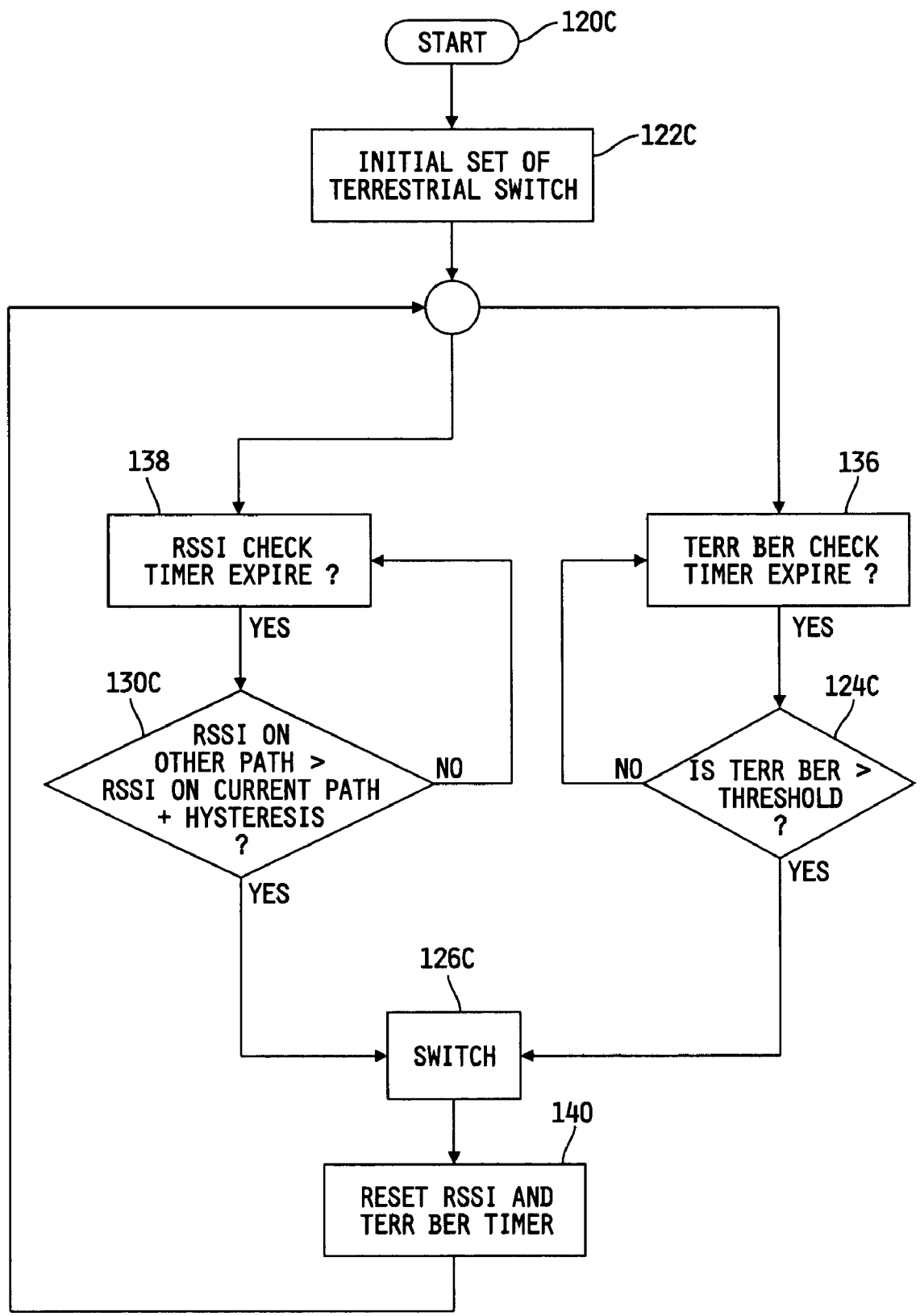

Referring now to FIG. 8, the operation of blocks 120C, 122C, 124C, 126C, and 130C are substantially identical to blocks having the same base reference numbers described with reference to previous figures. In the algorithm of FIG. 8, a BER check and an RSSI check are performed in a parallel fashion, albeit at different rates. More specifically, at block 136 microprocessor 26 waits until a BER check timer (e.g., 1.5 seconds) has expired. After expiration of the BER check timer, microprocessor 26 compares (at block 124C) the BER of the currently selected TERR bitstream to a threshold in the manner described above. If the current BER value does not exceed the threshold, then microprocessor 26 waits for the BER check timer to expire and performs another BER test. This loop will continue until the current BER value exceeds the threshold, which results in microprocessor 26 causing a TERR switch at block 126C. While performing the above-described BER tests, microprocessor 26 also compares the RSSI values of each incoming TERR bitstream. More specifically, at block 138 microprocessor 26 waits for a RSSI check timer (e.g., 128 ms or within the range of 64 ms to 4 seconds) to expire before comparing (at block 130C) the RSSI of the currently selected TERR bitstream to that of the unselected bitstream in the manner described above. If the unselected TERR bitstream does not have a better RSSI, then microprocessor 26 waits for the RSSI check timer to expire, and performs another test. When the unselected TERR bitstream has a better RSSI, microprocessor 26 causes a TERR switch at block 126C. After a TERR switch as a result of the operation of either block 124C or block 130C, microprocessor 26 resets (at block 140) both the RSSI check timer and the BER check timer to avoid TERR switches in rapid succession. The above-described parallel loops are then repeated.

Figure 9:
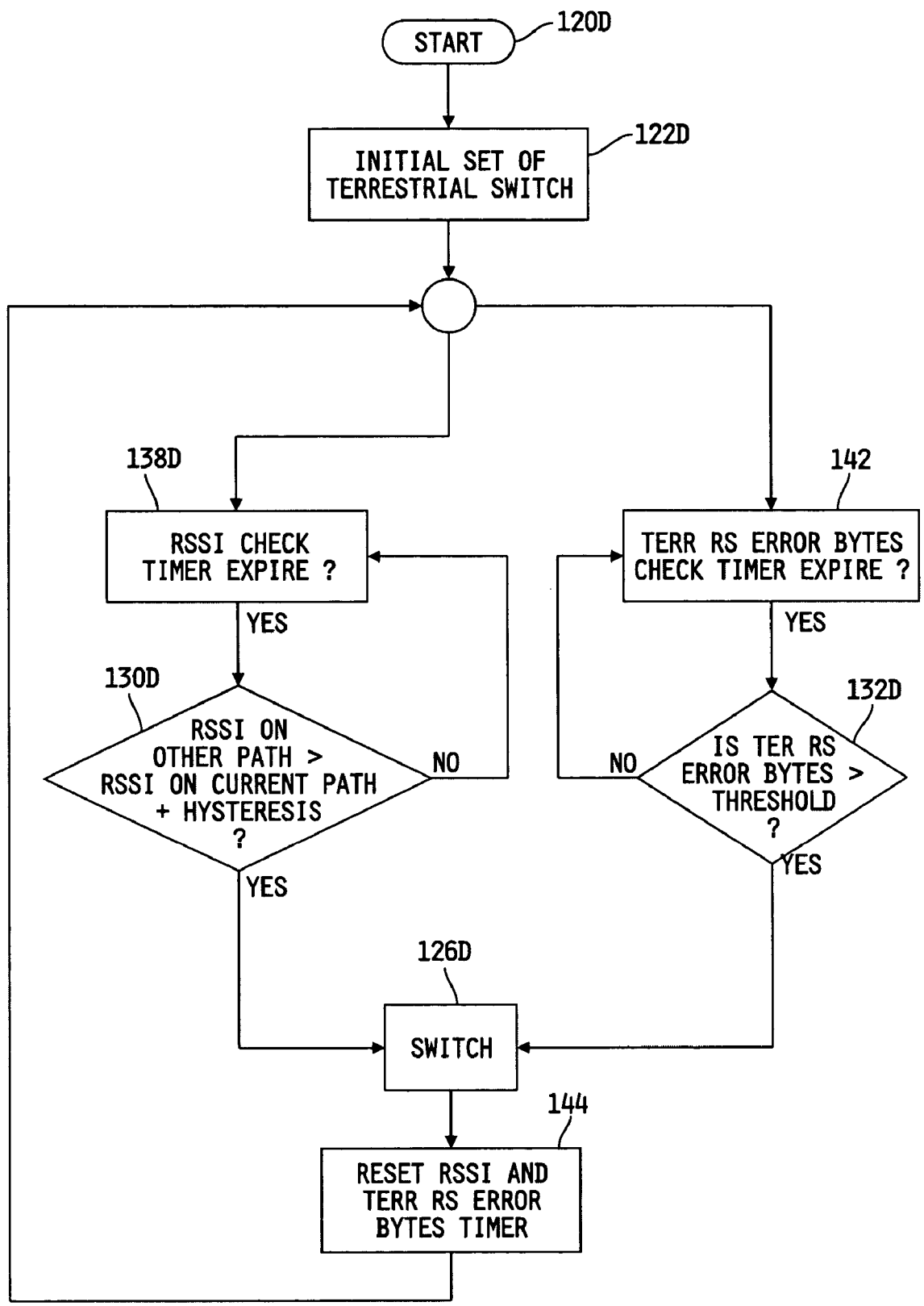

The algorithm depicted in the flow diagram of FIG. 9 is similar to that of FIG. 8 in that parallel TERR bitstream tests are performed simultaneously, albeit at different rates. Instead of the BER test performed in FIG. 8, the algorithm of FIG. 9 performs (at block 132D) a R/S error byte test as described above with reference to block 132 of FIG. 7 after waiting for an R/S error byte check timer (e.g., 1.5 seconds or within the range of 432 ms to 4 seconds) to expire at block 142. Also, instead of resetting the RSSI check timer and the BER timer at block 140 of FIG. 8, microprocessor 26 resets the RSSI check timer and the R/S error byte check timer at block 144 of FIG. 9.

Figure 10:
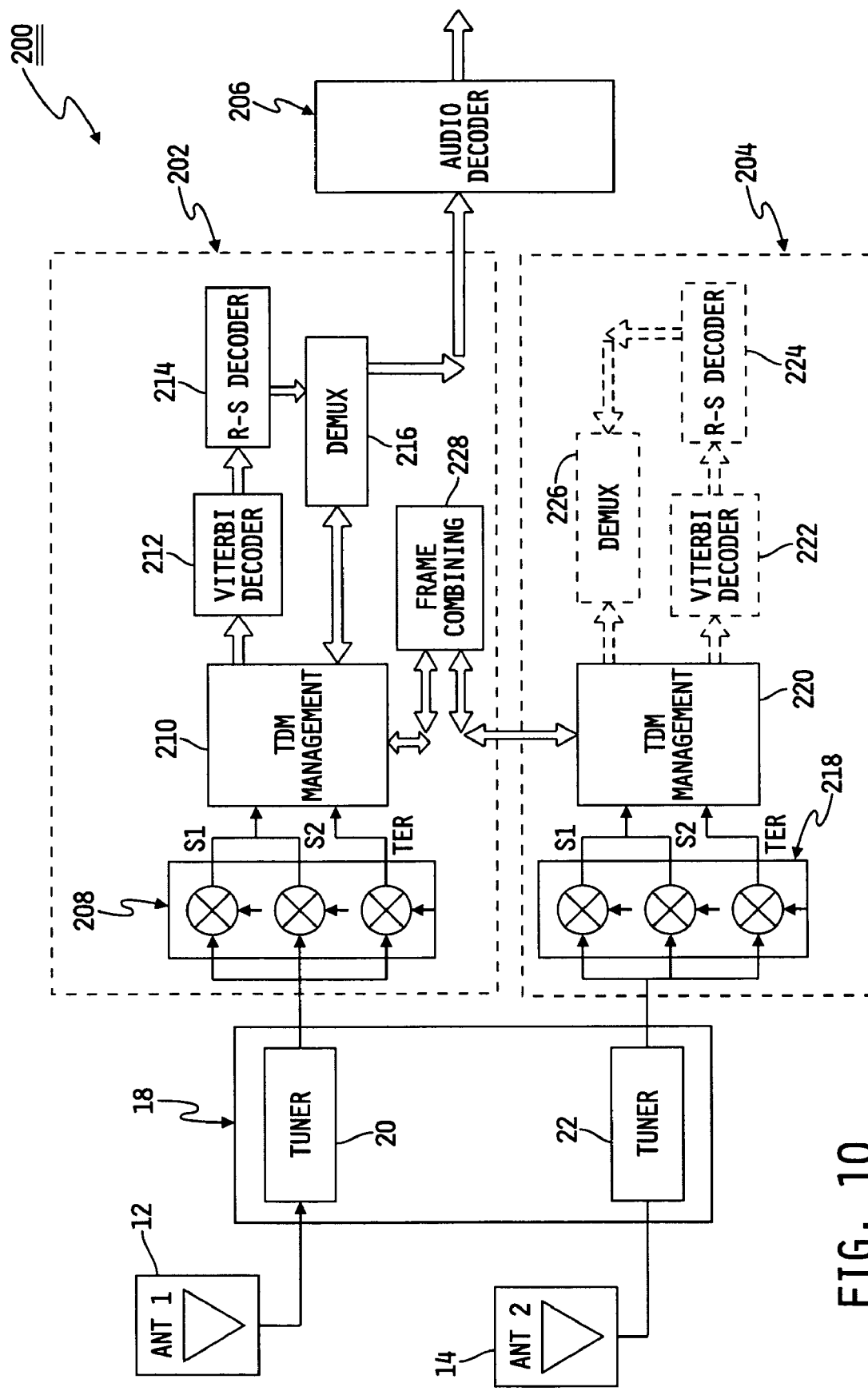
FIGS. 10 through 12 are schematic diagrams of dual baseband embodiments of systems according to the present invention.

FIG. 10 depicts one embodiment of a system 200 according to a dual baseband architecture of the present invention. Like the single baseband system 10 of FIG. 1, system 200 includes first and second antennae 12, 14, a tuner 18 having a first tuner path 20 connected to first antenna 12 and a second tuner path 22 connected to second antenna 14. System 200 further includes a first baseband 202 coupled to first tuner path 20, a second baseband 204 coupled to second tuner path 22, and an output audio decoder 206. First baseband includes a demodulator block 208 for demodulating each of the SAT1, SAT2 and TERR bitstreams received from first tuner path 20, a TDM management block 210 coupled to demodulator block 208, a viterbi decoder 212 at the output of TDM management block 210, a R/S decoder 214 at the output of viterbi decoder 212, and a payload packet demux 216 coupled to R/S decoder 214, TDM management block 210, and audio decoder 206. Similarly, second baseband 204 includes a demodulator block 218, a TDM management block 220, a viterbi decoder 222, a R/S decoder 224, and a payload packet demux 226. Payload packet demux 226 of second baseband 204 is not, however, connected to audio decoder 206. It should be understood that the payload packets demultiplexed by payload packet demux 216 and 226 are small building blocks of information for the user-selected channel referred to as PRCs in the XM Radio® system and clusters in the Sirius® system. Finally, first baseband 202 includes a frame combining block 228 for reconstructing channel information as is further described below.

In the dual baseband implementation of FIG. 10, all three bitstreams from each of antennae 12, 14 are processed. After demodulation at demodulator blocks 208, 218, the bitstreams are arranged in the required time sequences. Then, the frame synchronization headers are extracted from the bitstreams by utilizing state of the art correlation functions. Consequently, the frames are perfectly synchronized to avoid the delay caused by the network (e.g., the delays between SAT1 and SAT2, SAT1/SAT2 and TERR, etc.). After the frame synchronization, the combining is performed according to a quality estimation of the frame. This quality estimation is here defined as frame synchronization header correlation ratio. The combining algorithm utilized by frame combining block 228 chooses the best quality frame and drops the inferior quality frame. Therefore, in the second path baseband 204, the later processing blocks (blocks 222, 224, and 226, shown in dashed lines) are not needed since only one combined frame will be passed along for further processing. In this embodiment, the combining is performed at the beginning of digital baseband processing, which may achieve the fastest decision without inducing processing delay caused by viterbi decoder 212, R-S decoder 214, and demux 216. After the combined frame is passed to TDM management block 210, the TDM timing information is recovered. Then the combined frame is TDM demuxed according to the extracted timing info using an inverse process to that which occurs at the transmitter side. All the payload packets are re-allocated at the correct time slots. The data stream is transferred into memory 48 for temporary storage with coordination between TDM management block 210, demux 216, and microprocessor 26. The payload packets for the user-selected channel are retrieved from memory 48 and passed to viterbi decoder 212 and R-S decoder 214 for error correction and decoding. The number of payload packets may vary depending on the channel selected. Viterbi decoder 212 cyclically processes the individual payload packet on a first-in-first-out basis. Meanwhile, the Bit Error Rate is calculated and reported on a payload packet basis by viterbi decoder 212. Viterbi decoder 212 detects and corrects the random type of errors according to its nature. R-S decoder 214 decodes the burst type of errors and corrects them if the number of errors is within its error correction capability. The decoded data stream is sent to the payload packet demux 216 for encapsulation, then the encapsulated data is sent to audio decoder 206 for audio decoding according to principles that are known in the art.

Figure 11:
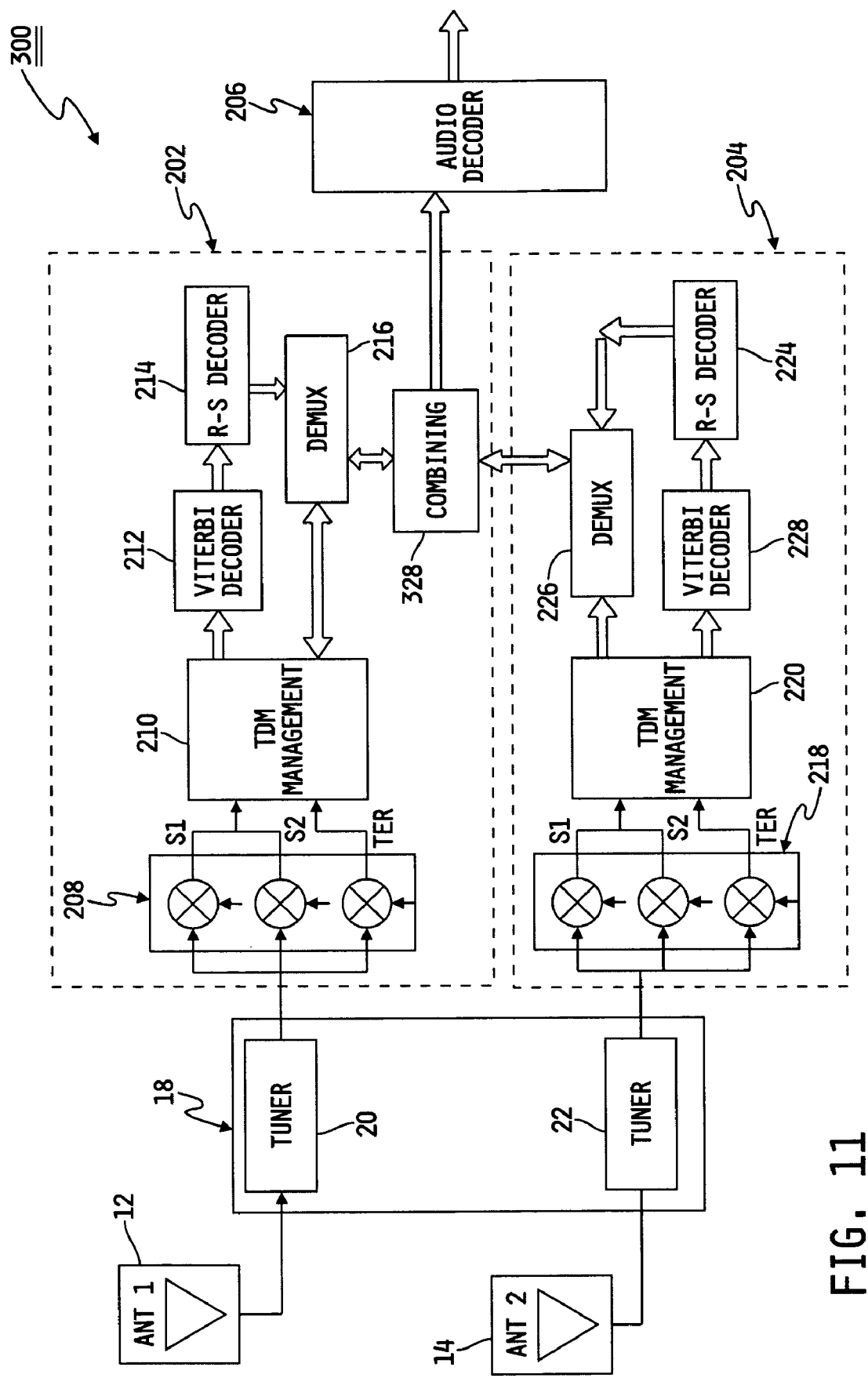

FIG. 11 depicts an alternate embodiment of a dual baseband implementation. As shown, instead of frame combining block 228 as used in system 200 of FIG. 10, system 300 of FIG. 11 includes a payload packet combining block 328, which is coupled to both payload packet demuxs 216, 226. Otherwise, the systems are identical. The payload packets (e.g., 6848 bits) are substantially smaller than frames, which include a plurality of payload packets. Accordingly, by comparing the data from first baseband 202 with the corresponding data from second baseband 204 on a payload packet-by-payload packet basis, as opposed to frame-by-frame, system 300 avoids the use of errors in the bitstreams that do not affect the quality of the resulting signal in the decision of which bitstream sample to use for constructing the resulting signal. The trade-off, however, is that instead of comparing frame-by-frame at the front end of the processing path in system 200, system 300 actually processes all of the incoming information through viterbi decoders 212, 222, R/S decoders 214, 224, and payload packet demuxs 216, 226. This additional processing takes time, and the associated time delay before comparison may be undesirable.

Figure 12:
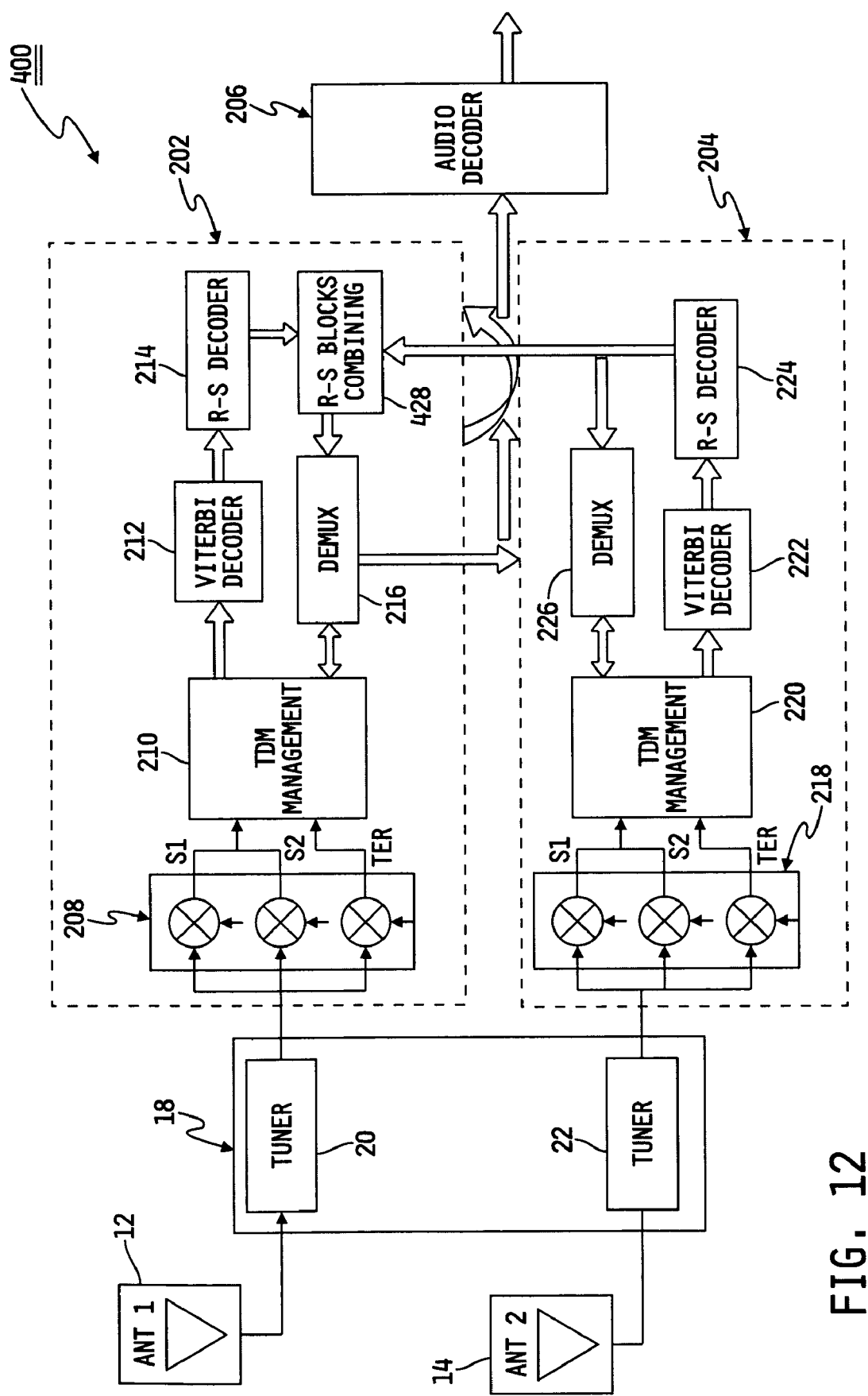

Referring now to FIG. 12, a third embodiment of a dual baseband system 400 is shown. As shown, system 400 includes an R/S blocks combining block 428 instead of either a frame combining block 228 or a payload packet combining block 328. R/S blocks combining block 428 is coupled to each R/S decoder 214, 224 and provides an output to payload packet demux 216. In this embodiment, the smallest block of usable data (i.e., R/S blocks of 255 bytes of information) are used for comparison and to construct the resulting signal. Instead of comparing payload packets as in system 300, which each include two R/S blocks, both of which are discarded for the unselected payload packet, system 400 compares bitstreams on a R/S block-by-R/S block basis, and discards only the corrupt R/S blocks. Additionally, system 400 avoids the delay associated with the additional processing of payload packet demuxs 216, 226.

Figures 13A, 13B:
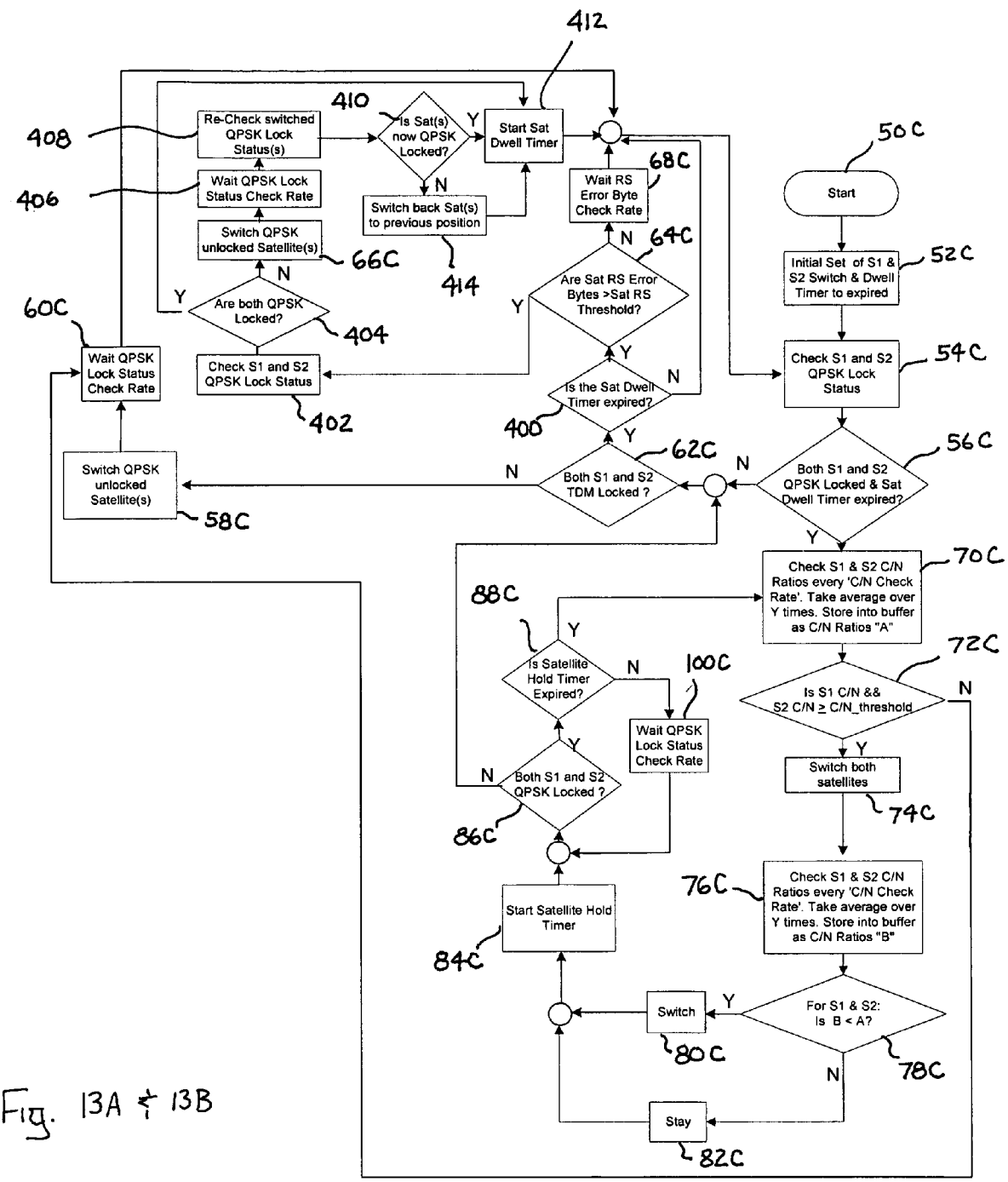

Referring now to FIGS. 13A and 13B, yet another single baseband embodiment of an algorithm for controlling satellite signal selection is depicted in flowchart form. This algorithm is similar to the algorithm of FIGS. 3A and 3B. As such, similar reference designations are used for similar blocks, and only the differences between the two algorithms are described below. Generally, the algorithm of FIGS. 13A and 13B differs from that of FIGS. 3A and 3B in that it incorporates an additional timer, the "Dwell Timer," as described below. The Dwell Timer provides a waiting period during which no action is performed. This permits the receiver to receive a relatively stable signal for a large percentage of the time. As explained above, switching generally occurs under weak signal conditions wherein the received signal can frequently fade above and below sensitivity thresholds. If switching is performed too quickly, many phase perturbations may be introduced into the system, and may cause additional errors in the demodulated data stream. By incorporating a Dwell Timer (using a dwell time in the range, for example, of 512 ms to 4000 ms), the receiver has a longer period to attempt to use the weak signal. Moreover, the receiver does not switch from its current signal path unless a stronger signal is detected on the opposite path during a QPSK lock check. In other words, this algorithm gives priority to the last acceptable antenna path instead of treating each path equally.

At block 52C, the Dwell Timer is initially set to expired. After the QPSK Lock Status indicators are read at block 54C, they are checked at decision block 56C as described above. Decision block 56C also determines whether the Dwell Timer is expired. If decision block 56C does not indicate that both the SAT1 and SAT2 bitstreams are QPSK locked and that the Dwell Timer is expired, then microprocessor 26 reads the TDM Lock Status indicator from baseband 25 for each of the SAT1 and SAT2 bitstreams at block 62C in the manner described above with reference to block 62 of FIGS. 3A and 3B. If microprocessor 26 determines that both bitstreams are TDM locked at decision block 62C, then microprocessor 26 determines at decision block 400 whether the Dwell Timer is expired. If not, the loop returns to block 54C. If, however, the Dwell Timer is expired, then (at decision block 64C) microprocessor 26 reads the R/S error bytes corresponding to the combined bitstream of SAT1 and SAT2, and compares that value to the predefined threshold as described above with reference to FIGS. 3A and 3B. If the combined bitstream has R/S error byte counts that are less than the threshold, then satellite switching does not occur, and the algorithm waits the R/S Error Byte Check Rate at block 68C. If, on the other hand, the combined bitstream has R/S error counts that exceed the threshold, then the QPSK Lock Status of SAT1 and SAT2 are again read at block 402 and checked at block 404. If both SAT1 and SAT2 are QPSK locked, then the Dwell Timer is reset at block 412, and the loop returns to block 54C. If one or both of SAT1 and SAT2 are QPSK unlocked, then switching occurs at block 66C in the manner described above with reference to block 66 of FIGS. 3A and 3B. After switching at block 66C, and after a delay corresponding to the QPSK Lock Status Check Rate (block 406), microprocessor 26 again reads the lock status of SAT1 and SAT2 at block 408. If either (or both) of SAT1 and SAT2 are not locked (as determined at decision block 410), then they are switched back to their prevision position at block 414, and the Dwell Timer is reset at block 412. If both of SAT1 and SAT2 are locked at block 410, then the Dwell Timer is reset at block 412 and the loop returns to block 54C. The remainder of FIGS. 13A and 13B is identical to the corresponding components of FIGS. 3A and 3B.

Figures 14A, 14B:
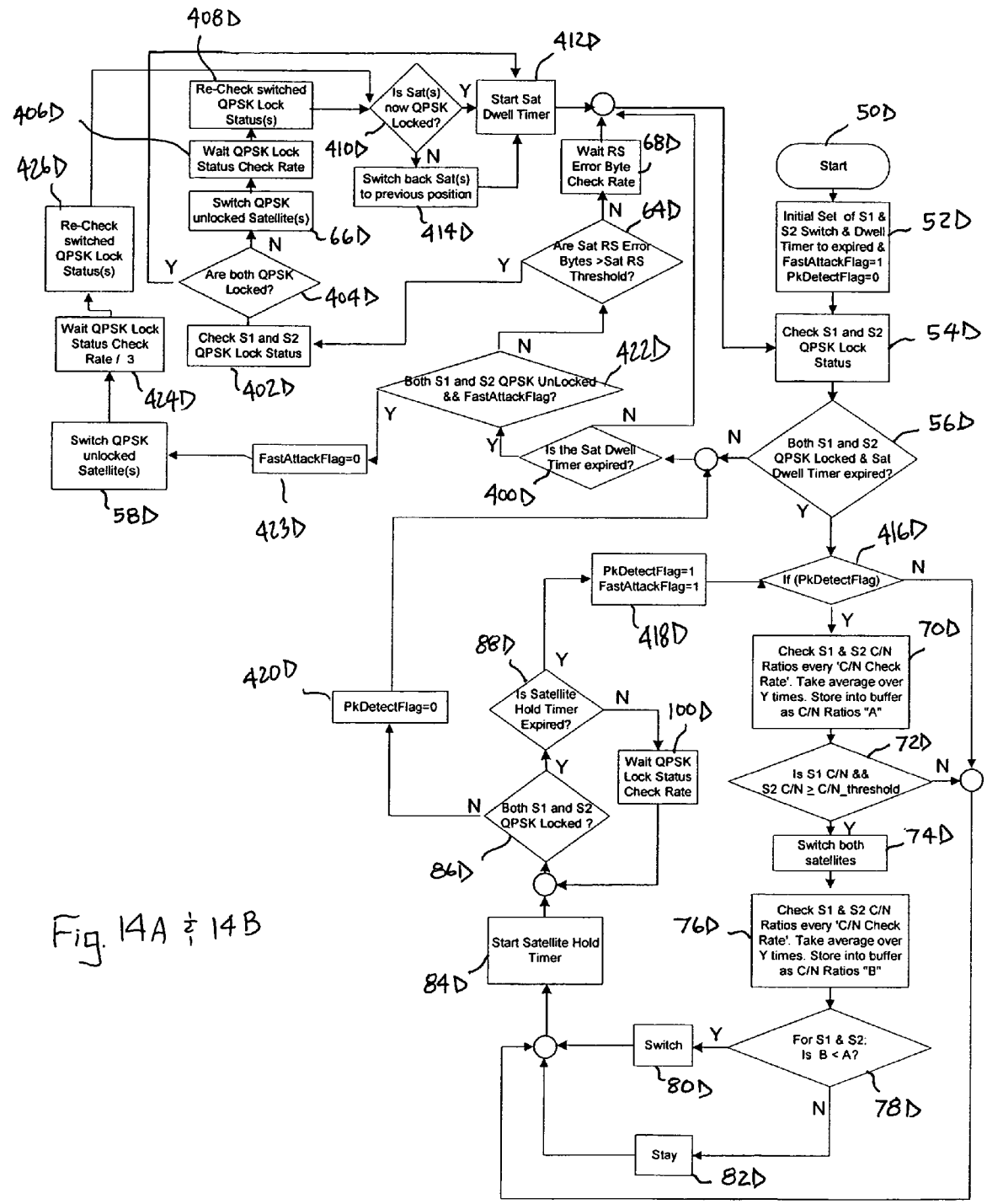

FIGS. 14A and 14B depict yet another single baseband embodiment of an algorithm for controlling satellite signal selection. This algorithm is similar to the algorithm of FIGS. 13A and 13B. As such, similar reference designations are used for similar blocks, and only the differences between the two algorithms are described below. Generally, the algorithm of FIGS. 14A and 14B differs from that of FIGS. 13A and 13B in that it incorporates a "Fast Attack Flag" which, as described below, facilitates a quicker response by the receiver to a loss in QPSK lock under specific conditions. In general, the conditions under which the Fast Attack Flag is used includes conditions of very deep and sudden signal fades on a given tuner path 20, 22, such as when a vehicle equipped with system 10 drives behind a building. Under such circumstances, the other tuner path 20, 22 may still have a good signal, but a burst of errors can occur because the switch to that tuner path 20, 22 is not made quickly enough. The Fast Attack Flag permits a rapid, single attempt to switch to the superior path 20, 22 to reduce errors. As is further described below, once the Fast Attack Flag is set, the algorithm of FIGS. 14A and 14B follows the normal paths until the Fast Attack Flag is reset. The reset occurs only within the peak detection portion of the algorithm. Thus, the reset occurs only under conditions wherein both tuner paths 20, 22 are currently receiving a good signal for at least the length of the satellite hold timer of block 84D. This implementation prevents the Fast Attack Flag from operating under very weak signal conditions where fades occur frequently.

The functions of blocks 50D, 52D, 54D, and 56D are identical to the corresponding blocks of FIGS. 13A and 13B, except that the Fast Attack Flag is initialized to "1" and a Peak Detect Flag is initialized to "0" at block 52D. If, at block 56D, both the SAT1 and SAT2 bitstreams are determined to be QPSK locked and the Dwell Timer is expired, then decision block 416D determines whether the Peak Detect Flag is set to "1." The initial check of the Peak Detect Flag (which was initialized to "0") will be negative. As such, the satellite hold timer is begun at block 84D. At decision block 86D, microprocessor 26 determines whether both SAT1 and SAT2 bitstreams are QPSK locked. The algorithm continues to loop through blocks 86D, 88D, and 100D in the manner described above with reference to the corresponding blocks of FIGS. 3A and 3B until one of the SAT1 or SAT2 bitstreams becomes QPSK unlocked, or the satellite hold timer expires. When the satellite hold timer expires as determined at block 88D, the Fast Attack Flag and Peak Detect Flag are set to "1" at block 418D. Consequently, the result of decision block 416D is affirmative, and microprocessor 26 reads, potentially averages, and stores the C/N ratios of the bitstreams at block 70D as described above. As also described above with reference to FIGS. 3A and 3B, the C/N ratios are compared (at block 72D) to a predetermined threshold value indicating relatively strong signal reception. If one or both of the C/N ratios are below the threshold, instead of entering the delay period of block 60A as in FIGS. 3A and 3B, control is again transferred to block 84D where the satellite hold timer is started. Otherwise, the peak detect operation described with reference to FIGS. 3A and 3B is carried out When decision block 86D indicates that one or both of the SAT1 and SAT2 bitstreams are QPSK unlocked, the Peak Detect Flag is set to "0" at block 420D, and the Dwell Timer is checked at decision block 400D. If the Dwell Timer is not expired, then control is passed to block 54D. If, on the other hand, the Dwell Timer is expired, then decision block 422D determines whether both bitstreams are unlocked and whether the Fast Attack Flag equals "1." If both of these conditions are true, then the Fast Attack Flag is set to "0" (block 423D) and the unlocked satellites are immediately switched at block 58D. Otherwise, microprocessor 26 reads the R/S error bytes corresponding to the combined bitstream of the SAT1 and SAT2 bitstreams at block 64D and operation continues as previously described. After satellite switching at block 58D, the algorithm waits (at block 424D) a time period corresponding to one-third of the QSPK lock status rate. It should be understood that other fractions of the QPSK lock status rate, or other independent wait periods could readily be implemented by one of ordinary skill in the art. In the embodiment depicted in FIGS. 14A and 14B, the reduced wait period corresponding to one-third of the QPSK lock status rate permits re-checking the lock status of the SAT1 and SAT2 bitstreams (at blocks 426D and 410D) three times more quickly than the algorithm of FIGS. 13A and 13B.

Figures 15A, 15B:
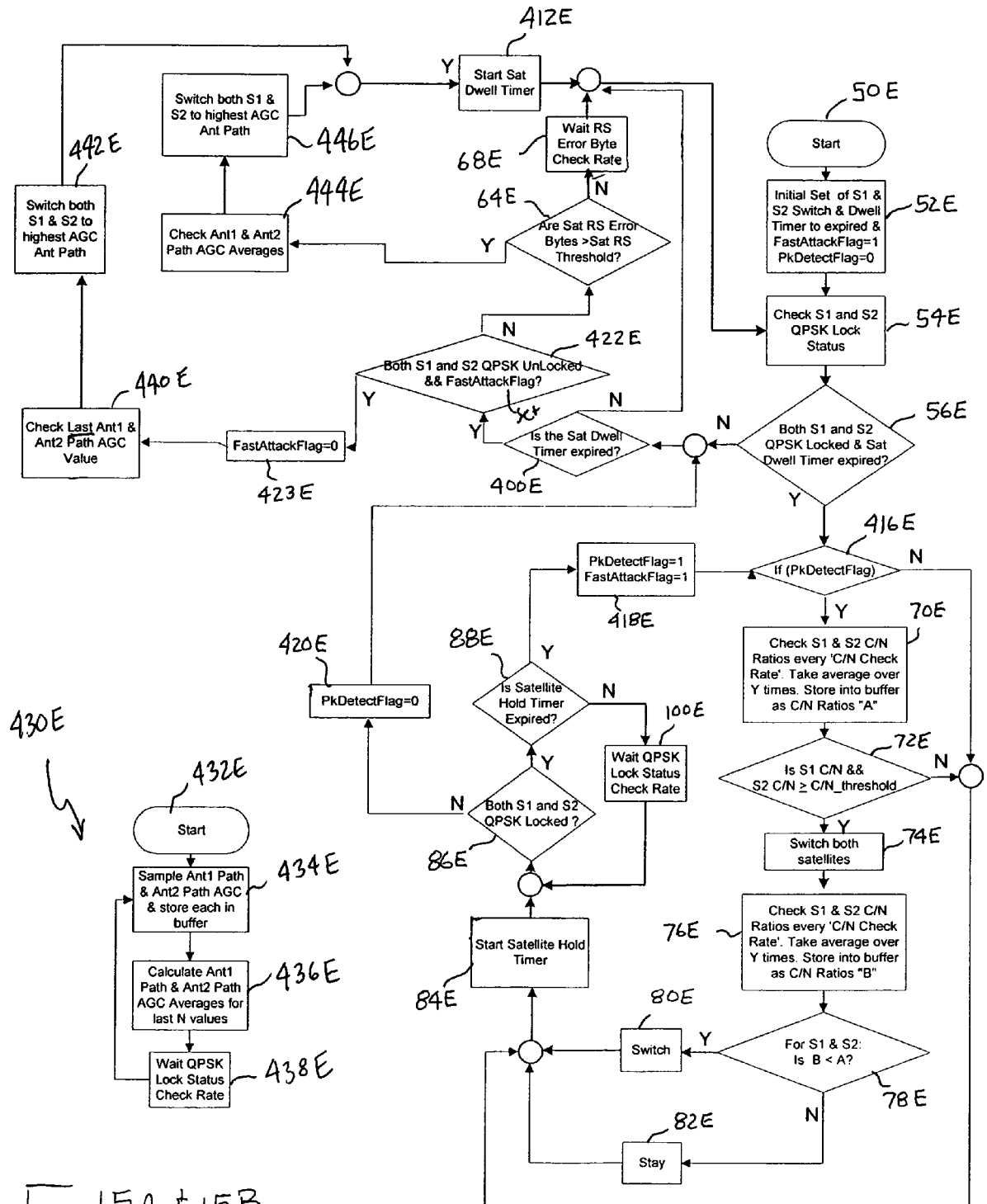

FIGS. 15A and 15B depict another single baseband embodiment of an algorithm for controlling satellite signal selection. This algorithm is similar to the algorithm of FIGS. 14A and 14B. As such, similar reference designations are used for similar blocks, and only the differences between the two algorithms are described below. Generally, the algorithm of FIGS. 15A and 15B differs from that of FIGS. 14A and 14B in that it utilizes automatic gain control (AGC) in the satellite switching determination instead of the QPSK lock status of the SAT1 and SAT2 bitstreams. In general, the AGCs of both tuner paths 20, 22 are calibrated and used to determine the signal strength received at each antenna 12, 14.

AGC calibration enables accurate switch decisions when using the embodiments of FIGS. 15A and 15B, and FIGS. 16A and 16B. AGC is a parameter used to determine the total received signal strength within the channel bandwidth. For this received signal strength measurement to be accurate, the gain in the signal path is determined to map the AGC voltage to the corresponding signal strength. The gain is determined because the AGC uses the total voltage gain of the receiver when determining the signal strength. There may be many points of gain variation in the system from the antenna through the tuner path. Because of these variations, two different paths may report different AGC values for the same signal. For the described embodiments, it is less important to know the absolute signal strength than the relative signal strength of the two paths being compared. The goal is to simply choose the stronger of the two signals, regardless of their absolute signal strengths. To determine the gains relative to each other, a known signal strength is presented to both antennae. One way to do this is to use C/N ratio measurements to determine a total channel power. By combining the SAT 1 C/N ratio and the SAT 2 C/N ratio for a given path, a total channel power can be estimated. For example, if SAT 1 C/N ratio=10 dB and SAT 2 C/N ratio=10 dB, then the total received channel power is 13 dB. The AGC voltage can then be measured at that channel power. When the second path has the same total channel power, the AGC voltage on that path can be measured and compared to the previous path. The difference between these two voltages becomes the calibration that is used when comparing the AGCs during the switch decisions. This AGC calibration should be done in the absence of the TERR bitstream because the TERR bitstream may add to the total channel power in a manner that is not accounted for in a simple calculation. This calibration can be run periodically to keep the values accurate. A default calibration can be performed in manufacturing that takes only the tuner gains into account until a field calibration occurs in the proper conditions.

A mapping of voltage to corresponding signal strength is made and used to compare tuner paths 20, 22. The AGC voltages are sampled, in the described embodiment, at the QPSK lock status check rate and stored in a buffer as described below. Under the above-described conditions wherein the Fast Attack Flag is employed for rapid satellite switching, the last sampled AGC voltage for each tuner path 20, 22 is used to determine which path has the stronger signal. As described below, both satellites are then switched to the stronger signal path. Under other operating conditions wherein R/S error bytes exceed a predetermined threshold (as further described below), the algorithm of FIGS. 15A and 15B uses the last N values of the buffered AGC samples for each tuner path 20, 22 are averaged and compared to identify the stronger signal. In one implementation of the invention, the number of samples averaged is five (i.e., N=5). After the stronger signal is identified using the averaged samples, both satellites are switched to the stronger tuner path 20, 22. Consequently, the algorithm of FIGS. 15A and 15B provides information relating to the strength of both tuner paths 20, 22 before a satellite switch is made. This approach may reduce the number of switches, which in turn may reduce the amount of phase perturbations added as a result of switching.

As shown in FIGS. 15A and 15B, the algorithm includes a separate loop for sampling and buffering AGC samples. The ACG loop 430E depicts sampling and buffering the AGC values for each of tuner paths 20, 22 at block 434E. At block 436E, an average for each tuner path 20, 22 is taken of the last N AGC values. Finally, at block 438E, loop 320E waits the QPSK lock status check rate before returning to block 434E. As should be understood from the foregoing, loop 430E continuously updates the AGC values and calculates a rolling average at a rate corresponding to the QPSK lock status check rate.

The remainder of FIGS. 15A and 15B is identical to the corresponding components of FIGS. 14A and 14B, except for the satellite switching associated with the Fast Attack Flag and the handling of excess R/S error bytes. More specifically, after the Fast Attack Flag is set to "0" at block 423E, the algorithm (at block 440E) obtains the last AGC value stored in the buffer for each of tuner path 20, 22. At block 442E, both SAT1 and SAT2 are switched to the tuner path 20, 22 having the highest AGC value. As was the case with the algorithm of FIGS. 14A and 14B, after satellite switching, the Dwell Timer is initiated at block 412E and QPSK lock status checking is performed at block 54E. Under non-fast attack conditions (i.e., when the outcome of decision block 422E is negative), the R/S error byte comparison of decision block 64E is performed in the manner described above. If the R/S error bytes exceed the predetermined threshold, then block 444E checks the most recent AGC averages as sampled and stored by loop 430E. Then, both SAT1 and SAT2 are switched at block 446E to the tuner path 20, 22 having the highest average AGC value.

Figures 16A, 16B:
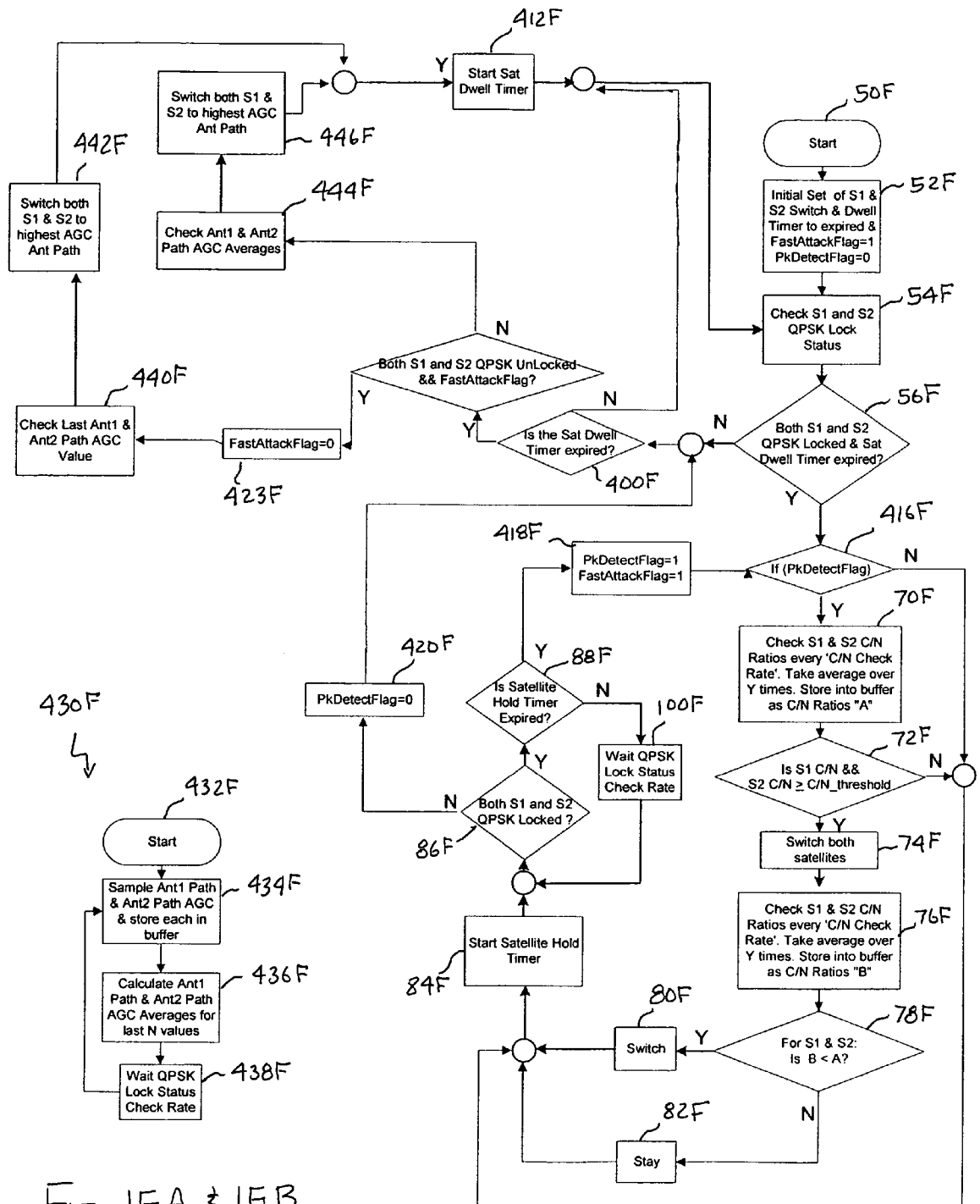

FIGS. 16A and 16B depict yet another single baseband embodiment of an algorithm for controlling satellite signal selection. This algorithm is similar to the algorithm of FIGS. 15A and 15B. As such, similar reference designations are used for similar blocks, and only the differences between the two algorithms are described below. Generally, the algorithm of FIGS. 16A and 16B differs from that of FIGS. 15A and 15B in that the R/S error byte comparison to a predetermined threshold (block 64E) and the R/S error byte check rate delay (block 68E) are eliminated, thereby forcing a satellite switching determination to be made every time the Dwell Timer expires. In some instances, the step of waiting for the predetermined R/S error threshold to be exceeded results in undesirably delayed switching that permits the occurrence of too many errors. Removing the error threshold step permits the algorithm to track more closely the best signal obtained through tuner paths 20, 22 at any given time.

Finally, it should be understood that combinations of the various above described embodiments may readily be constructed and implemented, and are within the scope of the present invention. More particularly, any one of the above-described dual baseband architectures may be combined with a single baseband diversity algorithm to facilitate additional antennae to complement the overall antenna pattern. For example, a four-antenna system could be constructed wherein each baseband switches between two antennae and the resulting output signals from each baseband are combined using one of the above-described dual baseband techniques.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An SDARS receiver for use with at least two antennae, each of which receives a SAT1 bitstream from a first satellite and a SAT2 bitstream from a second satellite, the receiver including:

a SAT1 demodulator configured to switch between demodulating the SAT1 bitstream from one of the antennae and demodulating the SAT1 bitstream from the other of the antennae;

a SAT2 demodulator configured to switch between demodulating the SAT2 bitstream from one of the antennae and demodulating the SAT2 bitstream from the other of the antennae; and a processor coupled to the demodulators, the processor being configured to switch the demodulators according to an algorithm wherein if a currently demodulated SAT1 bitstream from one of the antennae is QPSK unlocked, then the processor switches the SAT1 demodulator to demodulate the SAT1 bitstream from the other of the antennae, and if a currently demodulated SAT2 bitstream from one of the antennae is QPSK unlocked, then the processor switches the SAT2 demodulator to demodulate the SAT2 bitstream from the other of the antennae; wherein the processor determines a C/N ratio for each of the currently demodulated bitstreams when neither of the currently demodulated bitstreams is OPSK unlocked and the processor determines a first average C/N ratio over time for each of the currently demodulated bitstreams, wherein the processor switches each of the demodulators to demodulate a bitstream from a different antenna if both of the first average C/N ratios exceed a predetermined threshold wherein the processor determines a second average C/N ratio over time for each of the bitstreams from the different antenna after switching the demodulators and wherein the processor compares the second average C/N ratio to the first average C/N ratio for the bitstreams corresponding to each of the demodulators, and again switches demodulation to a bitstream from a different antenna for any demodulator having an associated second average C/N ratio that is less than its associated first average C/N ratio.

2. The receiver of claim 1, wherein the processor periodically determines a QPSK lock status of each of the currently demodulated bitstreams.

3. The receiver of claim 1, wherein the processor determines a TDM locked status of each of the currently demodulated bitstreams when one or both of the currently demodulated bitstreams is QPSK unlocked.

4. The receiver of claim 3, wherein the processor switches the demodulator corresponding to the QPSK unlocked bitstream if the TDM lock status of one of the currently demodulated bitstreams is TDM unlocked.

5. The receiver of claim 3, wherein the processor determines an R/S error byte count for each of the currently demodulated bitstreams when the TDM lock status of both of the currently demodulated bitstreams is TDM locked.

6. The receiver of claim 5, wherein the processor determines the R/S error byte count for each of the currently demodulated bitstreams when the TDM lock status of both of the currently demodulated bitstreams is TDM locked and a dwell timer is expired.

7. The receiver of claim 5, wherein the processor switches the demodulator corresponding to the QPSK unlocked bitstream if the R/S error byte count of one of the currently demodulated bitstreams exceeds a predetermined threshold.

8. The receiver of claim 1, wherein the processor is configured to detect a sudden reduction of signal strength of the currently demodulated bitstream, switch the demodulators, wait a predetermined period of time. and determine a QPSK lock status for each of the currently demodulated bitstreams within a fraction of a QPSK lock status check time period.

9. The receiver of claim 8, wherein the fraction is one-third of the QPSK lock status check timer period.

10. The receiver of claim 1, wherein the processor is configured to periodically sample an AGC value for each of the currently demodulated bitstreams.

11. The receiver of claim 10, wherein the processor is configured to respond to detection of a sudden reduction of signal strength of the currently demodulated bitstream by switching both demodulators to demodulate the bitstream having a greatest AGC value.

12. The receiver of claim 10, wherein the processor is configured to maintain a running average of AGC values, and to respond to detection of a sudden reduction of signal strength of the currently demodulated bitstream by switching both demodulators to demodulate the bitstream having the greatest average AGC value.

13. The receiver of claim 12, wherein the processor switches the demodulators to demodulate the bitstream having the greatest average AGC value without determining an R/S error byte count for each of the currently demodulated bitstreams.

14. A method of processing signals in an SDARS receiver for use with at least two antennae, each of which receives a SAT1 bitstream from a first satellite and a SAT2 bitstream from a second satellite, the method including:
   demodulating the SAT1 bitstream from one of the antennae;
   demodulating the SAT2 bitstream from one of the antennae;
   determining a QPSK lock status of each of the bitstreams;
   demodulating the SAT1 bitstream from the other of the antennae if the QPSK lock status of the SAT1 bitstream is unlocked;
   demodulating the SAT2 bitstream from the other of the antennae if the QPSK lock status of the SAT2 bitstream is unlocked;
   determining a first C/N ratio for each of a currently demodulated bitstreams when neither of the currently demodulated bitstreams is OPSK unlocked;
   switching each of the demodulators to demodulate the bitstream from a different antenna if both of the first C/N ratios exceed a predetermined threshold;
   determining a second C/N ratio for each of the bitstreams from the different antenna after switching the demodulators; and
   comparing the second C/N ratio to the first C/N ratio for the bitstreams corresponding to each of the demodulators, and again switching demodulation to the bitstream from the different antenna for any demodulator having an associated second C/N ratio that is less than its associated first C/N ratio.

15. The method of claim 14, further including the step of determining a TDM locked status of each of the currently demodulated bitstreams when one or both of the currently demodulated bitstreams is QPSK unlocked.

16. The method of claim 15, further including the step of switching the demodulator corresponding to the QPSK unlocked bitstream if the TDM lock status of one of the currently demodulated bitstreams is TDM unlocked.

17. The method of claim 16, further including the step of determining an R/S error byte count for each of the currently demodulated bitstreams when the TDM lock status of both of the currently demodulated bitstreams is TDM locked.

18. The method of claim 17, further including the step of switching the demodulator corresponding to the QPSK unlocked bitstream if the R/S error byte count of one of the currently demodulated bitstreams exceeds a predetermined threshold.

19. An SDARS receiver for use with at least two antennae, each of which receives a SAT1 bitstream from a first satellite and a SAT2 bitstream from a second satellite, the receiver including:
   a SAT1 demodulator configured to switch between demodulating the SAT1 bitstream from one of the antennae and demodulating the SAT1 bitstream from the other of the antennae;
   a SAT2 demodulator configured to switch between demodulating the SAT2 bitstream from one of the antennae and demodulating the SAT2 bitstream from the other of the antennae; and
   a processor coupled to the demodulators, the processor being configured to switch the demodulators according to an algorithm wherein if a currently demodulated SAT1 bitstream from one of the antennae is QPSK unlocked, then the processor switches the SAT1 demodulator to demodulate the SAT1 bitstream from the other of the antennae, and if a currently demodulated SAT2 bitstream from one of the antennae is QPSK unlocked, then the processor switches the SAT2 demodulator to demodulate the SAT2 bitstream from the other of the antennae, wherein the processor is configured to detect a sudden reduction of signal strength of the currently demodulated bitstream, switch the demodulators, wait a predetermined period of time, and determine a QPSK lock status for each of the currently demodulated bitstreams within a fraction of a QPSK lock status check time period.

20. The receiver of claim 19, wherein the fraction is one-third of the QPSK lock status check timer period.

21. An SDARS receiver for use with at least two antennae, each of which receives a SAT1 bitstream from a first satellite and a SAT2 bitstream from a second satellite, the receiver including:
   a SAT1 demodulator configured to switch between demodulating the SAT1 bitstream from one of the antennae and demodulating the SAT1 bitstream from the other of the antenna:
   a SAT2 demodulator configured to switch between demodulating the SAT2 bitstream from one of the antennae and demodulating the SAT2 bitstream from the other of the antennae; and
   a processor coupled to the demodulators, the processor being configured to switch the demodulators according to an algorithm wherein if a currently demodulated SAT1 bitstream from one of the antennae is QPSK unlocked, then the processor switches the SAT1 demodulator to demodulate the SAT1 bitstream from the other of the antennae, and if a currently demodulated SAT2 bitstream from one of the antennae is QPSK unlocked, then the processor switches the SAT2 demodulator to demodulate the SAT2 bitstream from the other of the antennae, wherein the processor is configured to periodically sample an AGC value for each of the currently demodulated bitstreams and the processor is configured to maintain a running average of AGC values and to respond to detection of a sudden reduction of signal strength of the currently demodulated bitstream by switching both demodulators to demodulate the bitstream having a greatest average AGC value.

22. The receiver of claim 21, wherein the processor switches the demodulators to demodulate the bitstream having the greatest average AGC value without determining an R/S error byte count for each of the currently demodulated bitstreams.

23. An SDARS receiver for use with at least two antennae, each of which receives a SAT1 bitstream from a first satellite and a SAT2 bitstream from a second satellite, the receiver including:
- a SAT1 demodulator configured to switch between demodulating the SAT1 bitstream from one of the antennae and demodulating the SAT1 bitstream from the other of the antennae;
- a SAT2 demodulator configured to switch between demodulating the SAT2 bitstream from one of the antennae and demodulating the SAT2 bitstream from the other of the antennae; and
- a processor coupled to the demodulators, the processor being configured to switch the demodulators according to an algorithm wherein if a currently demodulated SAT1 bitstream from one of the antennae is QPSK unlocked, then the processor switches the SAT1 demodulator to demodulate the SAT1 bitstream from the other of the antennae, and if a currently demodulated SAT2 bitstream from one of the antennae is QPSK unlocked, then the processor switches the SAT2 demodulator to demodulate the SAT2 bitstream from the other of the antennae, wherein the processor determines a TDM locked status of each of the currently demodulated bitstreams when one or both of the currently demodulated bitstreams is QPSK unlocked and the processor switches the demodulator corresponding to the QPSK unlocked bitstream if the TDM lock status of one of the currently demodulated bitstreams is TDM unlocked.

24. The receiver of claim 23, wherein the processor determines an R/S error byte count for each of the currently demodulated bitstreams when the TDM lock status of both of the currently demodulated bitstreams is TDM locked.

25. The receiver of claim 24, wherein the processor determines the R/S error byte count for each of the currently demodulated bitstreams when the TDM lock status of both of the currently demodulated bitstreams is TDM locked and a dwell timer is expired.

26. The receiver of claim 24, wherein the processor switches the demodulator corresponding to the QPSK unlocked bitstream if the R/S error byte count of one of the currently demodulated bitstreams exceeds a predetermined threshold.

27. A method of processing signals in an SDARS receiver for use with at least two antennae, each of which receives a SAT1 bitstream from a first satellite and a SAT2 bitstream from a second satellite, the method including:
- demodulating the SAT1 bitstream from one of the antennae;
- demodulating the SAT2 bitstream from one of the antennae;
- determining a QPSK lock status of each of the bitstreams;
- demodulating the SAT1 bitstream from the other of the antennae if the QPSK lock status of the SAT1 bitstream is unlocked;
- demodulating the SAT2 bitstream from the other of the antennae if the QPSK lock status of the SAT2 bitstream is unlocked;
- determining a TDM locked status of each of the currently demodulated bitstreams when one or both of the currently demodulated bitstreams is QPSK unlocked; and
- switching the demodulator corresponding to the QPSK unlocked bitstream if the TDM lock status of one of the currently demodulated bitstreams is TDM unlocked.

28. The method of claim 27, further including the step of determining an R/S error byte count for each of the currently demodulated bitstreams when the TDM lock status of both of the currently demodulated bitstreams is TDM locked.

29. The method of claim 28, further including the step of switching the demodulator corresponding to the QPSK unlocked bitstream if the R/S error byte count of one of the currently demodulated bitstreams exceeds a predetermined threshold.

* * * * *